US009626814B2

(12) United States Patent
Eyring et al.

(10) Patent No.: US 9,626,814 B2
(45) Date of Patent: Apr. 18, 2017

(54) SMART DOOR LOCK

(71) Applicant: Vivint, Inc., Provo, UT (US)

(72) Inventors: Matthew J. Eyring, Provo, UT (US); Jeremy B. Warren, Draper, UT (US); James E. Nye, Alpine, UT (US); Jason C. Flint, Highland, UT (US); James Beagley, Taylorsville, UT (US); Wallace E. Day, Payson, UT (US); Christopher L. Harris, Holladay, UT (US); JonPaul Vega, Orem, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 14/977,061

(22) Filed: Dec. 21, 2015

(65) Prior Publication Data

US 2016/0180620 A1 Jun. 23, 2016

Related U.S. Application Data

(60) Provisional application No. 62/096,449, filed on Dec. 23, 2014, provisional application No. 62/143,203, filed on Apr. 5, 2015, provisional application No. 62/143,205, filed on Apr. 5, 2015.

(51) Int. Cl.
*G06K 5/00* (2006.01)
*G07C 9/00* (2006.01)
*H04M 11/02* (2006.01)

(52) U.S. Cl.
CPC ..... *G07C 9/00031* (2013.01); *G07C 9/00309* (2013.01); *H04M 11/02* (2013.01); *G07C 9/00571* (2013.01); *G07C 2009/00365* (2013.01); *G07C 2009/00793* (2013.01); *G07C 2209/64* (2013.01)

(58) Field of Classification Search
CPC ............ G07C 9/00039; G07C 9/00182; G07C 9/00571
USPC ......................................................... 235/382
See application file for complete search history.

(56) References Cited

U.S. PATENT DOCUMENTS 6,769,611 B2 * 8/2004 Miller .................... G07F 17/12
235/375
6,950,725 B2 9/2005 von Kannewurff et al.
(Continued)

FOREIGN PATENT DOCUMENTS

JP 2011-128770 A 6/2011
JP 2014-029703 A 2/2014

OTHER PUBLICATIONS

PCT International Search Report for International Application No. PCT/US2015/067251, mailed Apr. 19, 2016 (3 pp.).
(Continued)

*Primary Examiner* — Seung Lee
(74) *Attorney, Agent, or Firm* — Holland & Hart LLP

(57) ABSTRACT

In some embodiments, systems, methods, and techniques relating to security and/or automation systems, collectively referred to as automation systems, may include determining a presence of a first device proximate at least one entry to a location, obtaining information related to an identification of an entity associated with the at least one device, authenticating the first device, the authenticating based at least in part on obtaining information related to the identification, and taking an action based at least in part on determining the authenticity.

20 Claims, 20 Drawing Sheets

(56) References Cited

U.S. PATENT DOCUMENTS

| | | | |
|---|---|---|---|
| 7,012,503 B2* | 3/2006 | Nielsen | G07C 9/00103 340/5.6 |
| 7,653,603 B1* | 1/2010 | Holtkamp, Jr. | A47G 29/141 705/50 |
| 8,714,449 B2 | 5/2014 | Jentoft | |
| 2007/0168674 A1 | 7/2007 | Nonaka et al. | |
| 2009/0201198 A1* | 8/2009 | Moudy | G06Q 10/087 342/357.75 |
| 2010/0097225 A1 | 4/2010 | Petricoin, Jr. | |
| 2012/0229298 A1 | 9/2012 | Ree et al. | |
| 2014/0203078 A1 | 7/2014 | Radicella et al. | |
| 2014/0351899 A1 | 11/2014 | Dennis et al. | |

OTHER PUBLICATIONS

Li et al., "RFID Based Smart Home Architecture for Improving Lives," 2nd International Conference on Anti-Counterfeiting, Security and Identification (2008 ASID), Guiyang, China, 440-3, 2008.
Brush et al., "Home Automation in the Wild: Challenges and Opportunities," CHI 2011, May 7-12, Vancouver, BC, Canada, 2011.

\* cited by examiner

US 9,626,814 B2

SMART DOOR LOCK

CROSS-REFERENCE TO RELATED APPLICATIONS

The present application claims priority to U.S. Provisional Patent Application No. 62/096,449, titled: "Smart Card Reader," filed on Dec. 23, 2014, U.S. Provisional Patent Application No. 62/143,203, titled: "Smart Delivery," filed on Apr. 5, 2015, and U.S. Provisional Patent Application No. 62/143,205, titled: "Smart Door Lock Systems," filed on Apr. 5, 2015, and assigned to the assignee hereof, each of which is incorporated by this reference in its entirety.

BACKGROUND

The present disclosure relates to security and/or automation systems, and more particularly to reading a card or other elements via a reader located proximate a residence.

Accessing a home may present challenges. For example, physical keys may be misplaced, and lending out a physical key may lead to duplicate key copies or allowing a person to enter the entire home without confining the access to a desired area of the premise. In another example, if an automation system is present, a user may lose a key code, or not have the ability to enter a key code to unlock a door or disarm one or more aspects of the automation system.

In some examples, the door may have an electronic door unlock feature, but activating this feature may be slow or may require an inconvenient amount of time to activate before authorizing a user's entry. For example, the door unlock feature may enter a sleep state after a period of inactivity, and may then require a certain amount of time to transition from the sleep state to an awake state before allowing a user to interact with the door lock feature to lock or unlock a door.

SUMMARY

In some embodiments, security and/or automation systems (hereinafter "automation systems"), may activate a door-lock feature prior to physical interaction with the door lock mechanism. A camera located proximate an entry to a building may be enabled to detect motion. In some embodiments, the camera may detect motion occurring within a pre-determined distance from the entry. The camera may be additionally enabled to differentiate between environmental motion such as a passing vehicle, an animal, or wind and the movement of a person. In some embodiments, the camera may activate a door-lock feature based at least in part on detecting motion. The door-lock feature may allow a user to enter a home without the use of a key.

According to at least one embodiment, a method for a security and/or automation system is described. In some embodiments, the method may include determining a first presence of a first card located proximate at least one entry to a location, obtaining information related to an identification of an entity associated with the at least one card, wherein obtaining information comprises identifying at least one feature of the first card, performing an authentication on the first card, the authentication based at least in part on obtaining information related to the identification, and taking an action based at least in part on performing the authentication.

According to at least one embodiment, an apparatus for a security and/or automation system is described. In some embodiments, the method may include determining a first presence of a first card located proximate at least one entry to a location, obtaining information related to an identification of an entity associated with the at least one card, wherein obtaining information comprises identifying at least one feature of the first card, performing an authentication on the first card, the authentication based at least in part on obtaining information related to the identification, and taking an action based at least in part on performing the authentication.

According to at least one embodiment, a non-transitory computer-readable medium may further include determining a first presence of a first card located proximate at least one entry to a location, obtaining information related to an identification of an entity associated with the first card, wherein obtaining information comprises identifying at least one feature of the first card, performing an authentication on the first card, the authentication based at least in part on obtaining information related to the identification, and taking an action based at least in part on performing the authentication.

In some embodiments, the method, apparatus, and/or non-transitory computer-readable medium may further describe unlocking a door and/or disabling at least part of a security system.

In some embodiments, the method, apparatus, and/or non-transitory computer-readable medium may further describe before taking the action, sending information related to performing the authentication the first card to a user associated with the security and/or automation system, and receiving input from the user on which actions to take based on sending the information.

In some embodiments, the method, apparatus, and/or non-transitory computer-readable medium may further describe performing the authentication on the card by an analyzing data associated with an entity profile with the identification obtained.

In some embodiments, the method, apparatus, and/or non-transitory computer-readable medium may further describe wherein performing the authentication further comprises requesting additional information related to the first card; receiving additional information from the entity, and performing a second authentication on the first card, the authentication based at least in part on the additional information.

In some embodiments, the method, apparatus, and/or non-transitory computer-readable medium may further describes wherein analyzing data associated with the entity profile further comprises analyzing data associated with a service company.

In some embodiments, the method, apparatus, and/or non-transitory computer-readable medium may further describe, wherein determining the first presence of the first card further comprises emitting a discovery signal.

In some embodiments, the method, apparatus, and/or non-transitory computer-readable medium may further describe, wherein emitting the discovery signal further comprises emitting a directional signal, wherein the directional signal communicates with devices external to the location.

In some embodiments, the method, apparatus, and/or non-transitory computer-readable medium may further describe, wherein detecting the first presence of the first card further comprises obtaining identification information from the first card, wherein the first card may be at least one of: a radio frequency identification card, or a photo identification card, or an electronic chip card, or a card comprising a magnetic strip, or a smart card, or a card comprising or a quick response code, or a card comprising a bar code, or a combination thereof.

In some embodiments, the method, apparatus, and/or non-transitory computer-readable medium may further describe, wherein taking the action further comprises: authorizing a delivery to be delivered proximate to at least one entry to the location by the service company based at least in part on performing the authentication of the first card.

In some embodiments, the method, apparatus, and/or non-transitory computer-readable medium may further describes, wherein authorizing the delivery further comprises sending an entry code to a person associated with the first card.

In some embodiments, the method, apparatus, and/or non-transitory computer-readable medium may further describes, wherein sending the entry code further comprises sending a graphic to a portable electronic device associated with the person, wherein the graphic may be scanned by a second electronic device located proximate the at least one entry to the location.

In some embodiments, the method, apparatus, and/or non-transitory computer-readable medium may further describes, wherein authorizing the delivery further comprises sending an indication of a receipt.

In some embodiments, the method, apparatus, and/or non-transitory computer-readable medium may further describes, wherein in authorizing the delivery further comprises: unlocking a door at the entry to the location and/or disabling at least part of a security system; and authoring the service company to place the delivery in an interior room associated with the location.

In some embodiments, the method, apparatus, and/or non-transitory computer-readable medium may further describe determining a second presence of a second card proximate the at least one entry to the location; wherein obtaining information further comprises obtaining information related to a second identification of a second entity associated with the second card; performing an authentication of the second card, the authentication based at least in part on obtaining information related to the second identification; creating a ranking of the entities; and wherein taking the action further comprises taking the action based at least in part on the ranking.

In some embodiments, the method, apparatus, and/or non-transitory computer-readable medium may further describe determining the first card has been previously authorized; and wherein taking the action further comprises taking a pre-determined action based at least in part on determining the first card has been previously authorized.

In some embodiments, the method, apparatus, and/or non-transitory computer-readable medium may further describe determining an indication of a subsequent presence of the first card, the subsequent presence occurring within a pre-determined time from the first presence.

In some embodiments, a method for security and/or automation systems is described. The method may include receiving information regarding a detection of at least one card proximate at least one entry to a residence. One or more features may be recognized based at least in part on the receiving. The one or more features may be associated with a requested action.

The method may include linking the one or more features to a profile associated with an automation system. The method may additionally include taking an action requested by a user associated with the profile. The action may comprise unlocking a door and disabling a security system.

In some embodiments, the method may include associating the one or more features with a service company and transmitting the one of more features to a user of an automation system. Input from a user may be requested on which actions to take based at least in part on the transmitting. In some embodiments, the service company may be a delivery company. The one or more features may comprise an image of a delivery company identification card. A delivery by the delivery company may be authorized based at least in on the transmitting. One or more confirmations may be transmitted to the service company based at least in part on the authorizing. At least a portion of the automation system may be deactivated to allow the delivery to be placed inside the residence.

In some embodiments, the method may include receiving information regarding a detection of more than one card proximate the at least one entry to the residence and determining a profile associated with each card. A ranking of the profiles may be determined. The method may include performing one or more actions based at least in part on the ranking of the profiles. The action taken may be an action requested by the profile with a highest priority. A specific combination of detected cards may prompt a requested action based at least in part on the receiving. The card may be within a predetermined distance of a card reader proximate the at least one entry to the residence.

In some embodiments, an apparatus for security and/or automation systems is described. The apparatus may include a processor, memory in electronic communication with the processor, and instructions stored in the memory. The instructions may be executable by the processor to receive information regarding a detection of at least one card proximate at least one entry to a residence, recognize one or more features based at least in part on the receiving, and associate the one or more features with a requested action.

In some embodiments, a non-transitory computer-readable medium storing computer-executable code is described. The code may be executable by a processor to receive information regarding a detection of at least one card proximate at least one entry to a residence, recognize one or more features based at least in part on the receive, and associate the one or more features with a requested action.

In some embodiments, a method for security and/or automation systems is described. The method may include receiving information regarding a presence of a service personnel proximate an entry to a residence and determining a company associated with the service personnel based at least in part on the receiving. The method may further include validating an authenticity of the service personnel based at least in part on the determining and authenticating an action to be taken by the service personnel based at least in part on the validating.

In some embodiments, user approval may be received to authenticate the action to be taken by the service personnel. The action may comprise authenticating a delivery to be left at the entry to the residence. The authentication may be transmitted to the service personnel, wherein the authentication serves as a signature on delivery. The action may comprise unlocking a door and disabling at least a portion of a security system.

In some embodiments, the method may include receiving information detailing a reason for a visit by the service personnel and transmitting a name of the company and the reason for the visit of the service personnel to a user of an automation system. Input may be requested from the user on which actions to take based at least in part on the transmitting. At least a portion of the automation system may be deactivated to allow a delivery to be placed inside the residence. In some embodiments, refuting information may be received that the service personnel is not associated with the company. Additional information may be requested from the service personnel. The authenticity of the service personnel may be revalidated based at least in part on the additional information. In some embodiments, an entry code may be delivered to the service personnel. The entry code may be a graphical code and may be scannable by a camera proximate the entry to the residence.

In some embodiments, an apparatus for security and/or automation systems is described. The apparatus may comprise a processor, memory in electronic communication with the processor, and instructions stored in the memory. The instructions may be executable by the processor to receive information regarding a presence of a service personnel proximate an entry to a residence and determine a company associated with the service personnel based at least in part on the receiving. The instructions may be further executable to validate an authenticity of the service personnel based at least in part on the determining and authenticate an action to be taken by the service personnel based at least in part on the validating.

In some embodiments, a non-transitory computer-readable medium storing computer-executable code is described. The code may be executable by a processor to receive information regarding a presence of a service personnel proximate an entry to a residence and determine a company associated with the service personnel based at least in part on the receiving. The code may be further executable to validate an authenticity of the service personnel based at least in part on the determining and authenticate an action to be taken by the service personnel based at least in part on the validating.

In some embodiments, a method for security and/or automation systems is described. The method may include receiving information regarding a detection of motion proximate an entry to a residence and identifying a device proximate the entry to the residence based at least in part on the detecting. The method may further include validating an authenticity of the identified device and activating a door-lock feature based at least in part on the validating wherein the door-lock feature is proximate the entry to the residence.

In some embodiments, validating the authenticity of the identified device may include associating the identified device with a user profile, wherein the user profile is linked to an automation system. In some embodiments, the method may include unlocking a door based at least in part on the associating. In some embodiments, the method may include sending a discovery signal to detect a one or more devices proximate the entry to the residence. The discovery signal is a directional signal and captures devices external to the residence.

In some embodiments, identifying a device may differentiate between newly discovered devices and devices with an established connection to an automation system. Identifying a device may further comprise identifying a device that recently connected to an automation system within a predetermined time duration. Receiving information regarding a detection of motion may further comprise identifying human motion proximate the entry to the residence. Receiving information regarding a detection of motion may further include identifying a vehicle proximate a driveway to a residence. The method may include detecting multiple devices proximate the entry to the residence and determining at least one of the multiple devices is associated with the automation system. The at least one of the multiple devices may be associated with a user profile. The motion detected by a camera may be proximate the entry to the residence. The device may be associated with a guest profile with permissions to enter the residence.

In some embodiments, an apparatus for security and/or automation systems is described. The apparatus may comprise a processor, memory in electronic communication with the processor, and instructions stored in the memory. The instructions may be executable by the processor to receive information regarding a detection of motion proximate an entry to a residence and identify a device proximate the entry to the residence based at least in part on the detecting. The instructions may be further executable by the processor to validate an authenticity of the identified device and activate a door-lock feature based at least in part on the validating wherein the door-lock feature is proximate the entry to the residence.

In some embodiments, a non-transitory computer-readable medium storing computer-executable code is described. The code may be executable by a processor to receive information regarding a detection of motion proximate an entry to a residence and identify a device proximate the entry to the residence based at least in part on the detecting. The code may be further executable by the processor to validate an authenticity of the identified device and activate a door-lock feature based at least in part on the validating wherein the door-lock feature is proximate the entry to the residence.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

In some embodiments, an automation system may allow a user to perform one or more actions and/or facilitate one or more interactions with (e.g., to a disarm one or more portions and/or elements) a security and/or automation system through the use of a card reader. The automation system may additionally authenticate one or more actions using a card associated with an administrator of the automation system, a technician of the automation system, a third-party company, etc. In some embodiments, the card may be a security card, an identification card, a license, or the like, and the card need not be specific to the automation system. For example, the card may be an identification card issued by a company, and the card may be detected and identified by the automation system. The company identification card may prompt one or more responses by the automation system; for example, validating personnel identity, validating delivery information, authorizing a delivery, deactivating one or more security features, and/or the like.

In other embodiments, the automation system may activate a door lock prior to tactile interaction with the door lock (e.g., entering a code by way of interaction with a touchscreen, a fingerprint scanner, etc.). An image capture, such as a camera, may be located proximate an entry to a residence and may detect motion occurring within a predetermined distance from the image capture device. In one example, the motion may be caused by a person or may be caused by a vehicle approaching the residence. In other examples, the motion may be caused by factors such as animals or tree branches blowing in the wind; however, the automation system may be enabled to differentiate environmental types of motion from motion specific to the residence. Once motion is detected, the automation system may send out a discovery signal to determine if the motion is linked to a device. If an associated device is detected, the automation system may determine if the device is linked to a profile associated with the automation system. If the device is linked to a profile, the automation system may activate a door-lock. In one example, the system may transmit a wireless signal to wake up the door-lock. In another example, the door lock may be a touch-sensitive device which may unlock a door to the residence based on one or more tactile inputs.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
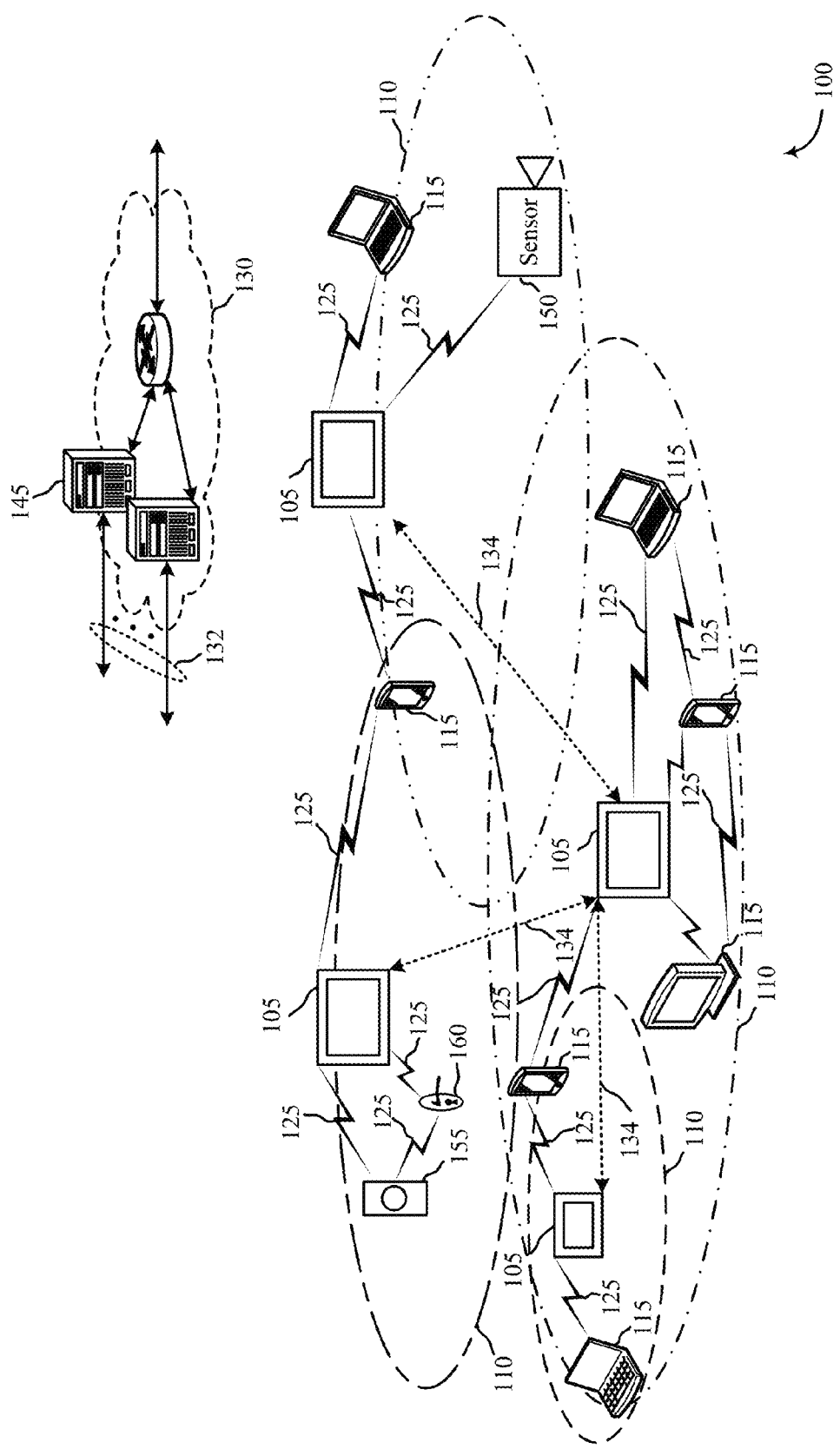
FIG. 1 shows a block diagram relating to a security and/or an automation system, in accordance with various aspects of this disclosure.

FIG. 1 illustrates an example of a communications system 100 in accordance with various aspects of the disclosure. The communications system 100 may include control panels 105, devices 115, a network 130, sensors 150, card readers 155, and/or door locks 160. The network 130 may provide user authentication, encryption, access authorization, tracking, Internet Protocol (IP) connectivity, and other access, calculation, modification, and/or functions. The control panels 105 may interface with the network 130 through wired and/or wireless communication links 132 to communication with one or more remote servers 145. The control panels 105 may perform communication configuration, adjustment, and/or scheduling for communication with the devices 115, or may operate under the control of a controller. In various examples, the control panels 105 may communicate—either directly or indirectly (e.g., through network 130)—with each other over wired and/or wireless communication links 134. Control panels 105 may communicate with a back end server (such as the remote servers 145)—directly and/or indirectly—using one or more communication links 132.

The control panels 105 may wirelessly communicate with the devices 115 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 may be dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A device 115 may also include or be referred to by those skilled in the art as a user device, a smartphone, a smartwatch or other wearable, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The control panels 105 may wirelessly communicate with the sensors 150 via one or more antennas. The sensors 150 may be dispersed throughout the communications system 100 and each sensor 150 may be stationary and/or mobile. A sensor 150 may include and/or be one or more sensors that sense: proximity, motion, temperatures, humidity, sound level, smoke, structural features (e.g., glass breaking, window position, door position), time, light geo-location data of a user and/or a device, distance, biometrics, weight, speed, height, size, preferences, light, darkness, weather, time, system performance, and/or other inputs that relate to a security and/or an automation system. A device 115 and/or a sensor 150 may be able to communicate through one or more wired and/or wireless connections with various components such as control panels, base stations, and/or network equipment (e.g., servers, wireless communication points, etc.) and/or the like.

The control panels 105 may also wirelessly communicate with the card readers 155 via one or more antennas. The card readers 155 may be dispersed throughout the communications system 100 and each card reader 155 may be proximate an entry to a premise. The entry may comprise a gate to access grounds or a door to access a building or residence. The card reader 155 may include any medium capable of reading a card. This may include a proximity card reader, smart card reader, Wiegand card, magnetic strip, barcode, photo identification reader, access control card reader, some combination thereof, or the like. The card reader 155 may additionally comprise an image capture device such as a camera, video camera, and/or security camera. The card reader 155 may be part of (or coupled to) a doorbell device.

The card reader 155 may be able to communicate through one or more wired and/or wireless connections with various components such as control panels, base stations, and/or network equipment (e.g., servers, wireless communication points, etc.) and/or the like.

The control panels 105 may also wirelessly communicate with the door lock 160 via one or more antennas. The door locks 160 may be dispersed throughout the communications system 100 and each door lock 160 may be proximate an entry to a premise. The entry may comprise a gate to access grounds and/or a door to access a building or residence. In some embodiments, the door lock 160 may be installed in a door and may include any type of lock capable of securing a door. The door lock 160 may additionally comprise one or more inputs including a key hole, a tactile input, or the like. The door lock 160 may be coupled to a doorbell device. The door lock 160 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115, card reader 155, door lock 160, and/or sensor 150 to a control panel 105, and/or downlink (DL) transmissions, from a control panel 105 to a device 115, card reader 155, door lock 160, and/or sensor 150. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments of the communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices via one or more direct communication links 134. Two or more devices 115 may communicate via a direct communication link 134 when both devices 115 are in the geographic coverage area 110 or when one or neither devices 115 is within the geographic coverage area 110. Examples of direct communication links 134 may include Wi-Fi Direct, BLUETOOTH®, wired, and/or other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

The card reader 155 may be proximate an entry to a premise and may enable a person to prompt the automation system to take one or more actions. In one embodiment, the card reader, card, person, or other contemplate item may be located proximate another person or item within a predetermined distance, regardless if the location is inside or outside of a location. For example, a card reader may be located on the outside of a residence, and the methods and systems described herein may enable a person to leave an item inside the house, where the location is proximate the outside card reader. In some embodiments, the card reader 155 may gather one or more pieces of information and transmit the information to a user located remotely from the automation system. In some embodiments, the information may comprise a request for an action and/or may comprise transmitting the information to user to alert them of action occurring at a residence.

The door lock 160 may be positioned proximate a door to a residence. The door lock 160 may control one or more aspects of a locking feature of the door. In some embodiments, the door lock 160 may be in a sleep state and require activation before being able to unlock or lock a door and thus enable or prevent entry. The door lock 160 may be activated by touch or may be activated by one or more commands from an automation system.

Figure 2:
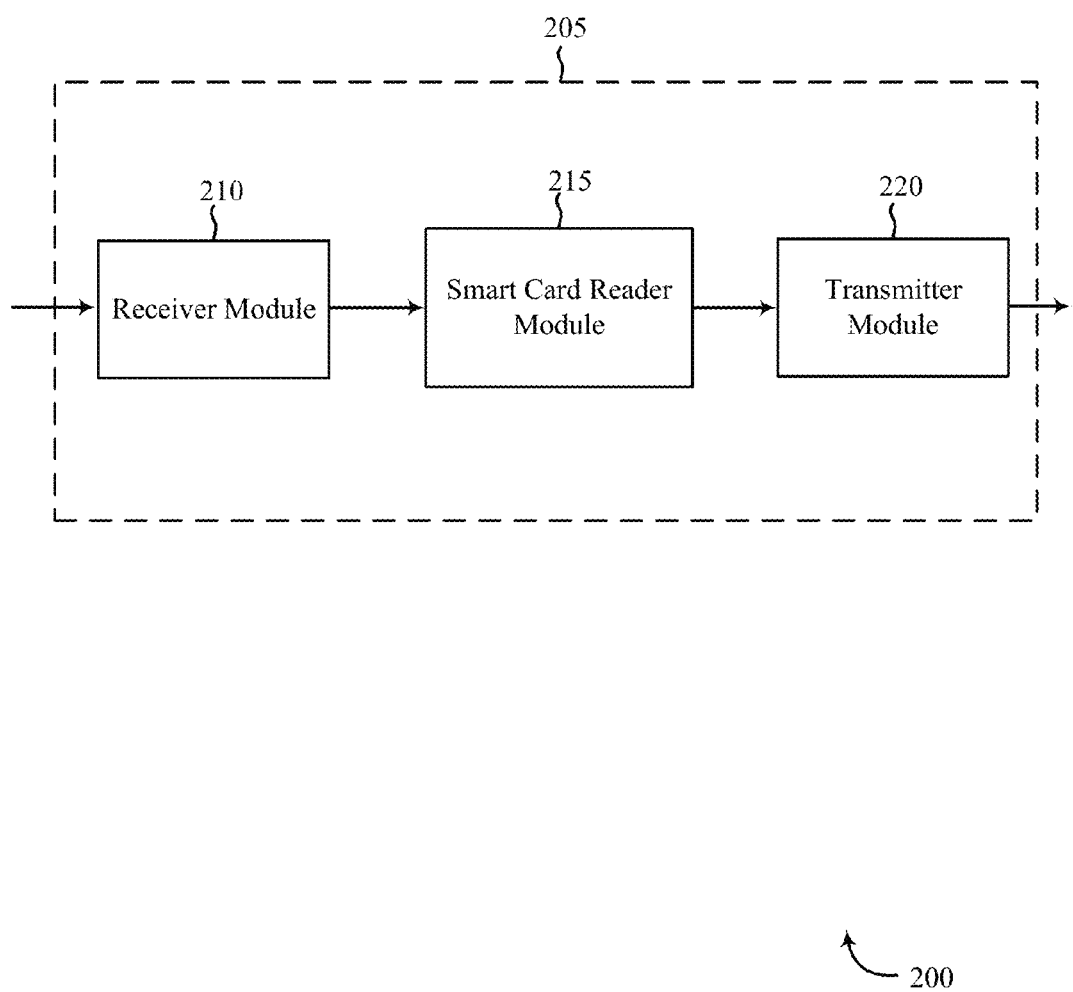
FIG. 2 shows a block diagram of a device relating to a security and/or an automation system, in accordance with various aspects of this disclosure.

FIG. 2 shows a block diagram 200 of an apparatus 205 for use in electronic communication, in accordance with various aspects of this disclosure. The apparatus 205 may be an example of one or more aspects of a control panel 105, a card reader 155, a door lock 160, and/or a remote server 145, described with reference to FIG. 1. The apparatus 205 may include a receiver module 210, a smart card reader module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive one or more pieces of information pertinent to a card proximate a card reader. Information may be passed on to the smart card reader module 215, and to other components of the apparatus 205.

The smart card reader module 215 may recognize one or more cards proximate a card reader and identify one or more features of the card. In some embodiments, the features may comprise one or more identifying features. For example, the feature may identify the card as associated with the automation system. The feature may additionally identify the card as being associated with an entity, such as a person, a company (e.g., service company, delivery company). In some instances, the feature may identify the card as an issued identification card such as a badge for an employee of a company, a school identification card, a driver's license, a government-issued photograph-identification card, a radio-frequency identification card, an electronic chip card and the like. The smart card reader module 215 may use the information to determine a subsequent action. If the card has features pre-approved by the automation system, the smart card reader module 215 may have pre-programmed steps to take. For example, if the card is linked to a profile, the smart card reader module 215 may take actions listed in the profile such as disabling a security system, unlocking an entry of the premises, and the like. If the features identify the card as not having a profile, one of more features of the card may be sent to a user of the automation system for further instructions. In still further embodiments, the features may identify the card as associated with the automation system, but a user may have an established relationship such that the smart card reader module 215 may take pre-programmed actions. In still further embodiments, an association may take the form of an authorization, and vice versa. For example, a cleaning service may be permitted entry based on an identification card, a package may be approved for delivery, a pest control company may be allowed on the premises, and the like.

The transmitter module 220 may transmit the one or more signals received from other components of the apparatus 205. The transmitter module 220 may transmit the one or more features of the card to a user of the automation system and/or may transmit one or more approves or denials to a person requesting action at an automation system. In some examples, the transmitter module 220 may be collocated with the receiver module 210 in a transceiver module.

Figure 3:
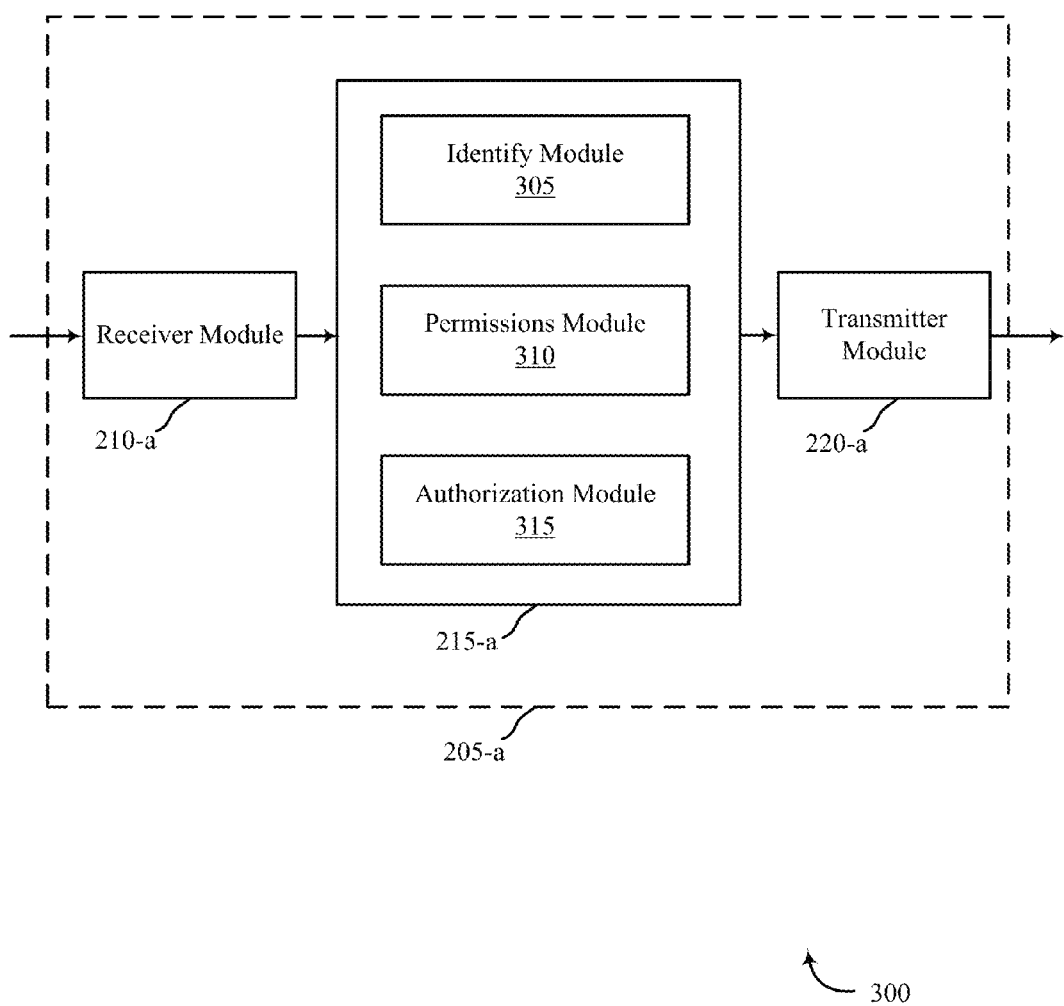
FIG. 3 shows a block diagram of a device relating to a security and/or an automation system, in accordance with various aspects of this disclosure.

FIG. 3 shows a block diagram 300 of an apparatus 205-a for use in wireless communication, in accordance with various examples. The apparatus 205-a may be an example of one or more aspects of a control panel 105, a card reader 155, a door lock 160, and/or a remote server 145 described with reference to FIG. 1. It may also be an example of an apparatus 205 described with reference to FIG. 2. The apparatus 205-a may include a receiver module 210-a, a smart card reader module 215-a, and/or a transmitter module 220-a, which may be examples of the corresponding modules of apparatus 205. The apparatus 205-a may also include a processor. Each of these components may be in communication with each other. The smart card reader module 215-a may include an identify module 305, a permissions module 310, and an authorization module 315. The receiver module 210-a and the transmitter module 220-a may perform the functions of the receiver module 210 and the transmitter module 220, of FIG. 2, respectively.

The components of the apparatus 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The identify module 305 may identify one or more features of the card. The identify module 305 may receive information pertaining to one or more images and/or self-identifying features of the card to determine a potential identity of the person associated with the card. The self-identifying features may comprise a code or image wirelessly transferred to the identify module 305. For example, the self-identifying code may comprise a radio frequency identification (RFID) which may wirelessly transfer a code to the identify module 305. In another embodiment, the card may comprise a pictorial representation of a self-identifying feature. For example, the card may comprise a quick response code (QR code), a barcode, an alpha-numerical, numerical, or alphabetical code, a name, a photograph such as a headshot, a logo of a company, and the like. In some embodiments, the identify module 305 may also receive information such as an image of the personnel and use a uniform the personnel is wearing to determine an identity of the personnel.

The identify module 305 may determine if the detected card is a commercial card and/or linked to a profile. If the card is a commercial card, the identify module 305 may link the card information to a particular entity, such as an organization, company, person or the like. A personnel profile associated with the card may exist. The personnel profile may allow certain companies to take actions, such as deliver a package, or perform select services at a residence, without additional approval from a remote user. The personnel profile may be pre-programmed by a user or may be created after a personnel has arrived at a residence.

The identify module 305 may additionally verify any identification card information for companies both with and without a personnel profile. In addition, a third party may provide verification information. The third party may further provide assurances that the identification card is valid. In some embodiments, the third party may comprise an issuer of the identification card such as a company or corporation, or may be an unassociated third party capable of providing verification information. Therefore, if a badge was reported stolen, an unrelated party may be unable to use the stolen badge to gain access to the residence. Another verification method may comprise using facial recognition to capture the image of the personnel associated with the badge and verify the personnel is the named person on the identification card. Other biometric features may additionally verify the personnel; for example, the identify module 305 may use biometric identifiers such as fingerprinting and/or voice recognition and/or retinal scanning. The identify module 305 may compare the biometric features of the personnel with a photo located on the identification badge, or may contact a commercial entity, such as the issuing company, to confirm the personnel through other biometric analysis.

In other embodiments, the identify module 305 may use a profile list provided by the company to verify information. The identify module 305 may additionally scan package information if the personnel is a delivery personnel and may use the package information to verify the identity. The package information may be sent to the delivery company to confirm details of the package such as barcode, origination address, and the like. If the correct personnel is delivering the package and the package details have been confirmed, the identify module 305 may validate the personnel.

If the card is linked to a profile, the identify module 305 may transfer the card information and the profile to the permissions module 310. If the identifying information is not linked to any saved profile and/or company, the identify module 305 may require one or more authorizations to be pursued by the permissions module 310.

The permissions module 310 may use the information from the identify module 305 to determine one or more permissions associated with the card. This may include performing one or more actions without specific authorization from an administrator. For example, the permissions module 310 may approve one or more actions requested in an identified user profile, personnel profile, or request further action from a user if no profile is found.

If the permissions module 310 receives confirmation that the card is associated with a personnel profile, the permissions module 310 may review the personnel profile to determine required actions. The required actions may comprise confirming the identity of the person and their association with the personnel profile. In some embodiments, the permissions module 310 may grant actions taken without specific user approval. For example, the personnel profile may allow a delivery person to place a package proximate a door to a residence. It may additionally disarm other sensors and/or settings to allow the personnel access to the home for preapproved actions. For example, cleaning personnel may be automatically granted entry to certain areas of a residence. In some embodiments, select security sensors may remain activated. For example, a home office may remain activated to alert a user if the cleaning personnel enter the room. The permissions module 310 may additionally authorize a delivery from a delivery company. The authorization may comprise an audible message, an electronic message, or a scannable message displayed on a display proximate the entryway. In some embodiments, the permissions module 310 may require further identification prior to taking action. For example, the permissions module 310 may require another proof of identity such as facial recognition, voice recognition, fingerprint, or another biometric feature. This may confirm the identity and allow the subsequent actions to be taken.

In some embodiments, a user may set up a personnel profile prior to personnel arriving at a residence. If a user is aware of a pending package delivery, the user may program an abbreviated profile with a prerecorded message to authorize an action. The abbreviated profile may identify a company delivery the package, and, in some embodiments, may identify the personnel delivering the package. Once the personnel scans his card and the card is approved and validated, if needs be, the user may request specific actions. The actions may include deactivating at least a portion of a security and/or automation system to allow delivery personnel to place a package inside a residence. The actions may additionally relay a message to the personnel. The message may be delivered audibly or in writing. The message may comprise instructions to the personnel. In some embodiments, the instructions may also provide authorization for the personnel. For example, if a user is expecting a package, the user may program a personnel profile and play a message to the delivery personnel to leave the package on the doorstep and that the message is proof of authorization. The delivery personnel may additionally be requested to scan one or more images, such as a barcode, from the package for added confirmation.

If the profile is associated with a user profile, the identified user profile may request one or more actions to occur. For example, if the card is associated with a resident of the home, the resident may request the front door be unlocked and a predetermined set of lights to be illuminated. The resident may request other actions be taken as well. For example, a security system may be disarmed and a verbal report of activity during an armed state may be audibly delivered to the resident. The resident may additionally link the action to a time frame. For example, if the resident returns home after work, the resident may wish for a hot water machine to be turned on to allow the user to have a cup of tea. Additionally, requests may be linked to seasons. In the winter, the resident may wish for a gas fireplace to ignite upon entry to the home, for holiday lighting to illuminate, or the like.

In another embodiment, multiple cards may be detected by the identify module 305 and the identifying feature may be transmitted to the permissions module 310. If multiple cards are sensed and conflicting actions are requested, the permissions module 310 may determine a priority of the profiles. For example, actions associated with a parent may take precedent over actions associated with a child. Additionally, a user's profile may take priority over a non-resident. In some embodiments, the permissions module 310 may additionally comprise taking one or more actions based on the combination of cards detected. For example, a resident may desire certain actions to be taken when she enters a house alone, but may wish for different actions to be selected depending on her company.

The authorization module 315 may seek user approval of one or more actions associated with information gathered by the identify module 305. The actions sought by the authorization module 315 may be actions unauthorized by the permissions module 310. The authorization module 315 may transmit one or more pieces of information relating to the card and/or personnel and may request authorization to perform a specific action or may request direction on actions to take. If the identify module 305 has associated the card with a specific company, the request may contain information pertaining to the company and appropriate actions relating thereto. For example, a delivery company may typically require access or an authorizing signature to deliver a package. If the user provides authorization, the authorization module 315 may allow the personnel to enter a vestibule of a residence and deliver the appropriate materials. The authorization module 315 may electronically send approval to the personnel. The authorization module 315 may also generate a signature of the personnel when the package is delivered. This signature may be sent to the user and serve as evidence that the personnel delivered the package.

In some embodiments, the personnel may show an identification card to a card reader to begin this process. The identify module 305 may receive information pertaining to a logo, name, picture, etc. on a badge associated with the personnel. The identify module 305 may additionally receive information regarding the personnel itself. The information may comprise a biometric feature, appearances such as a uniform, package information, and the like. The personnel may additionally speak and the authorization module 315 may interpret the speech and transpose the speech into one or more requested actions for the user to approve. For example, it may be a pest company requesting access to spray and/or inspect an exterior of a home. The user may either approve or reject the request electronically without having to be present at the residence.

Figure 4:
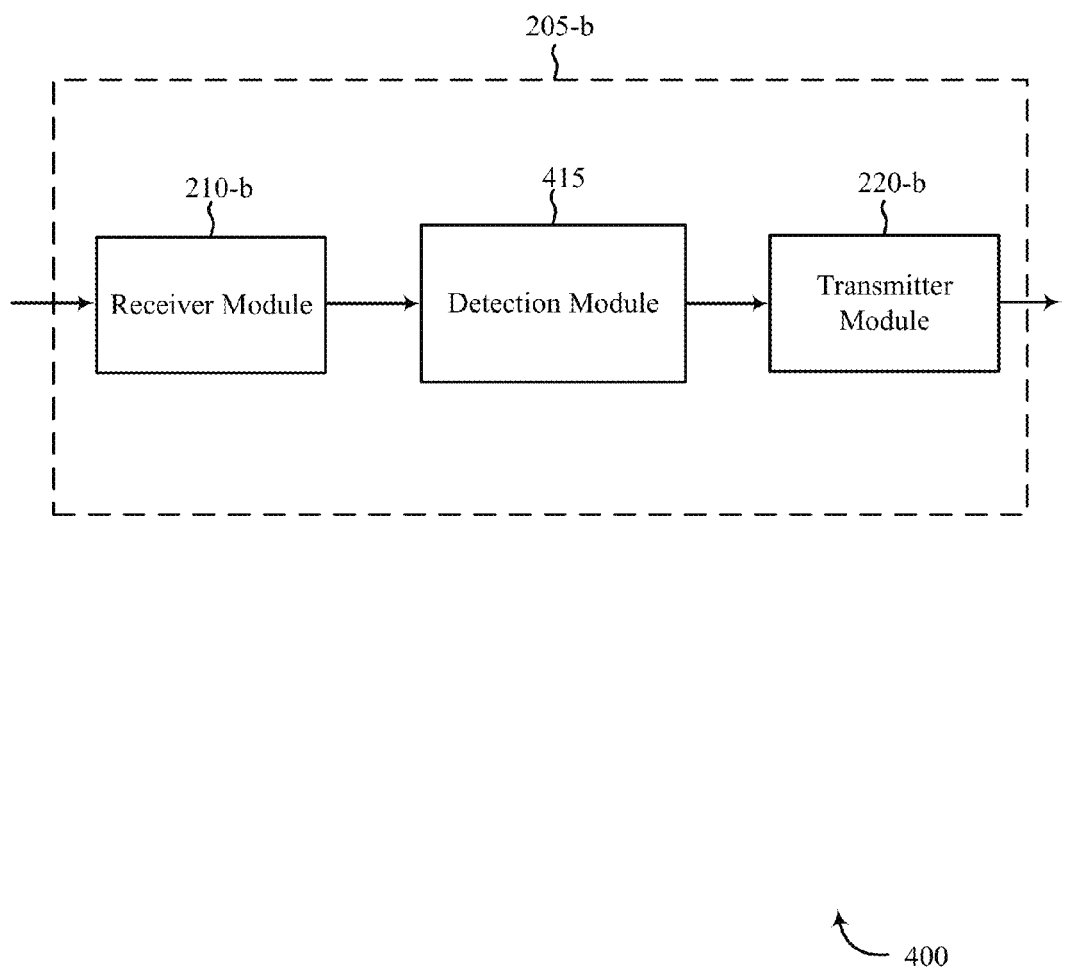
FIG. 4 shows a block diagram relating to a security and/or an automation system, in accordance with various aspects of this disclosure.

FIG. 4 shows a block diagram 400 of an apparatus 205-b for use in wireless communication, in accordance with various examples. The apparatus 205-b may be an example of one or more aspects of a control panel 105, a card reader 155, a door lock 160, and/or a remote server 145 described with reference to FIG. 1. It may also be an example of an apparatus 205 described with reference to FIGS. 2 and/or 3. In some embodiments, the apparatus 205-b may detect when an identification card is within a predetermined distance of the apparatus 205-b. The apparatus 205-b may include a receiver module 210-b, a detection module 415, and/or a transmitter module 220-b. The receiver module 210-b and transmitter module 220-b may be examples of the corresponding modules of apparatus 205. The apparatus 205-b may also include a processor. Each of these components may be in communication with each other. The receiver module 210-b and the transmitter module 220-b may perform the functions of the receiver module 210 and the transmitter module 220, of FIG. 2, respectively.

The components of the apparatus 205-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The detection module 415 may include various signaling protocols to detect a multiple of types of identification cards proximate an entry to a building and/or residence. The detection module 415 may comprise ANT+, Bluetooth, cellular, IEE protocols, ISA protocols, infrared communication system, near field communication (NFC), radio frequency identification (RFID), wireless personal are network (WPAN) protocols, ultra-wide band (UWB) protocols, Wi-Fi, wireless highway addressable remote transducer (HART) protocols, Wireless USB, Zigbee, Z-wave, some combination thereof, and the like.

In some embodiments, the identification card may not actually be a card but may be a wearable device. The wearable device may use one of the signaling protocols to communicate with the apparatus 205-b. The wearable device may make it easier for personnel to connect to the detection module 415. For example, a delivery person may be carrying packages and may use their wearable device to connect to the detection module 415 preventing the need to put packages down to communication with the automation system.

In some embodiments, the detections module may be tailored to each residence where the apparatus 205-b is installed. For example, a user of the automation system may list the companies they wish to use the detection module 415. Once a list of companies is known, the detection module 415 may be programmed to detect signaling protocols specific to those companies. The detection module 415 may sync with the companies to ensure their technology is continuously updating along with the companies technology without having any lapse in detection capabilities.

In still further embodiments, the detection module 415 may use a camera, speaker, microphone, sensor, user interface, or the like to detect the presence of an identification card. This embodiment is discussed further below with respect to FIG. 7.

Figure 5:
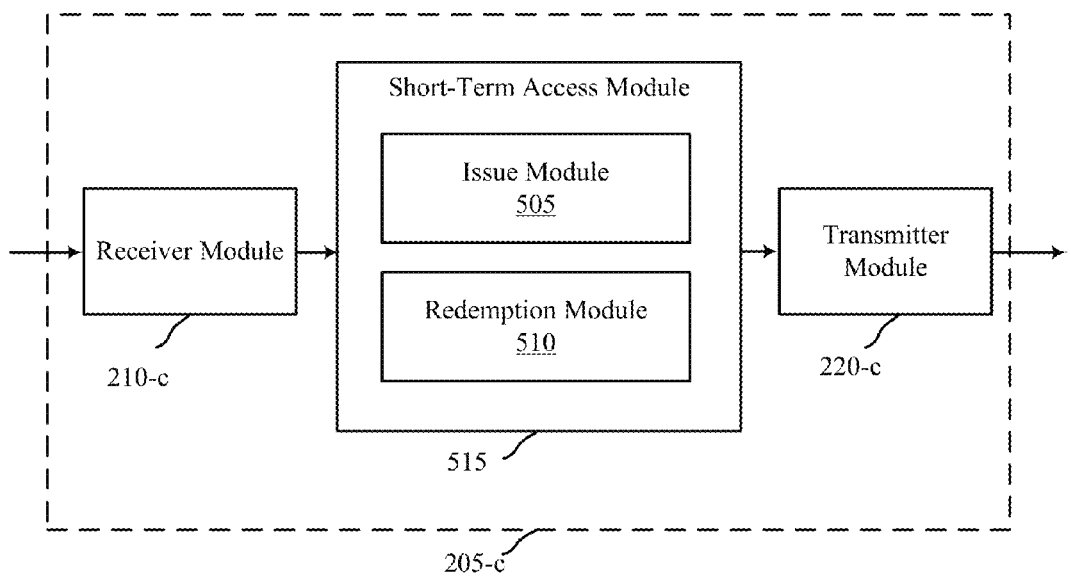
FIG. 5 shows a block diagram relating to a security and/or an automation system, in accordance with various aspects of this disclosure.

FIG. 5 shows a block diagram 500 of an apparatus 205-c for use in electronic communication, in accordance with various aspects of this disclosure. The apparatus 205-c may be an example of one or more aspects of a control panel 105, a card reader 155, a door lock 160, and/or a remote server 145, described with reference to FIG. 1. It may also be an example of an apparatus 205 described with reference to FIGS. 2-4. In some embodiments, the apparatus 205-*c* may detect a short-term entry code. The apparatus 205-*c* may include a receiver module 210-*c*, a short-term access module 515, and/or a transmitter module 220-*c*. The receiver module 210-*c* and transmitter module 220-*c* may be examples of the corresponding modules of apparatus 205, 205-*a*, and/or 205-*b*. The apparatus 205-*c* may also include a processor. Each of these components may be in communication with each other. In some embodiments, the short-term access module 515 a may include an issue module 505 and a redemption module 510.

The components of the apparatus 205-*c* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210-*c* may receive information such as packets, user data, and/or control information associated with various information channels (e.g., control channels, data channels, etc.). The receiver module 210-*c* may be configured to detect a short-term access code proximate a card reader. Information may be passed on to the short-term access module 515, and to other components of the apparatus 205-*c*.

The issue module 505 may allow a user of an automation system to grant known individuals limited access to the automation system. The limited access may comprise a predetermined level of access. The predetermined level of access may include a duration of usage, a time frame of usage, access limitations to selected areas, or some combination thereof. The individual may not require repetitive access to the automation system or the user may wish to limit the individual's access. In some embodiments, a user's ability to issue a short-term access may be limited. For example, a parent may not wish a child to have this permission. Likewise, in a commercial setting, an employer may wish to limit this ability to managerial staff, or the like.

To issue access to the individual, the issue module 505 may generate a short-term entry code. The short-term entry code may comprise a numerical key entry code or a graphical representation of a code such as a bar code or QR code. The short-term entry code may relay specific information to the automation system when redeemed. For example, the short-term entry code may trigger the short-term access module 515 to review the limited access parameters prior to allowing the individual to access the automation system. Once the short-term entry code is generated, the short-term entry code may be transferred to the individual. The short-term entry code may be sent via SMS, e-mail, or a similar medium.

The redemption module 510 may review the short-term entry code when the individual attempts to utilize it and determine follow-on actions to take based at least in part on the short-term entry code. To redeem the short-term entry code, the individual may need to scan the short-term entry code in a card reader (e.g. card reader 155, FIG. 1). The card reader may include a camera capable of detecting and transmitting the short-term entry code to the redemption module 510. The redemption module 510 may review the limited access parameters contained within the short-term entry code and determine if the parameters are satisfied. For example, the limited access parameters may restrict access to the automation system during a specific timeframe. The specific timeframe may include date and time. Additionally, the user may require additional authentication of the short-term entry code. For example, the individual may be required to display their fingerprint or stand in a select position for facial recognition. The redemption module 510 may have the biometric data stored to make a match, or may simply store the biometric data for future use or for assurances and additional identification parameters should the individual abuse his privileges and commit illicit acts. If the redemption module 510 determines the limited access parameters are satisfied, the redemption module 510 may issue a command to deactivate one or more portions of the automation system.

However, in some instances, even if the limited access parameters are satisfied, the redemption module 510 may generate an approval request to an administrator of the automation system. For example, the administrator may request approval access for all short-term entry codes issued by non-administrative users of the automation system. The administrator may have the option to approve the request or deny the request. In some instances, the approval request may include a listing of the information pertaining to the individual such as name and a photograph taken by the card reader device. Additionally, the approval request may include a reason for the short-term access along with the short-term access parameters and their status as currently satisfied.

The transmitter module 220-*c* may transmit the one or more signals received from other components of the apparatus 205-*c*. The transmitter module 220-*c* may transmit the one or more approvals to the individual attempting to access the system. The transmitter module 220-*c* may additionally transmit information to an administrator of the automation system to approve the short-term access to the automation system. If approval is received, the transmitter module 220-*c* may issue a command to deactivate a portion of the automation system. In some examples, the transmitter module 220-*c* may be collocated with the receiver module 210-*c* in a transceiver module.

Figure 6:
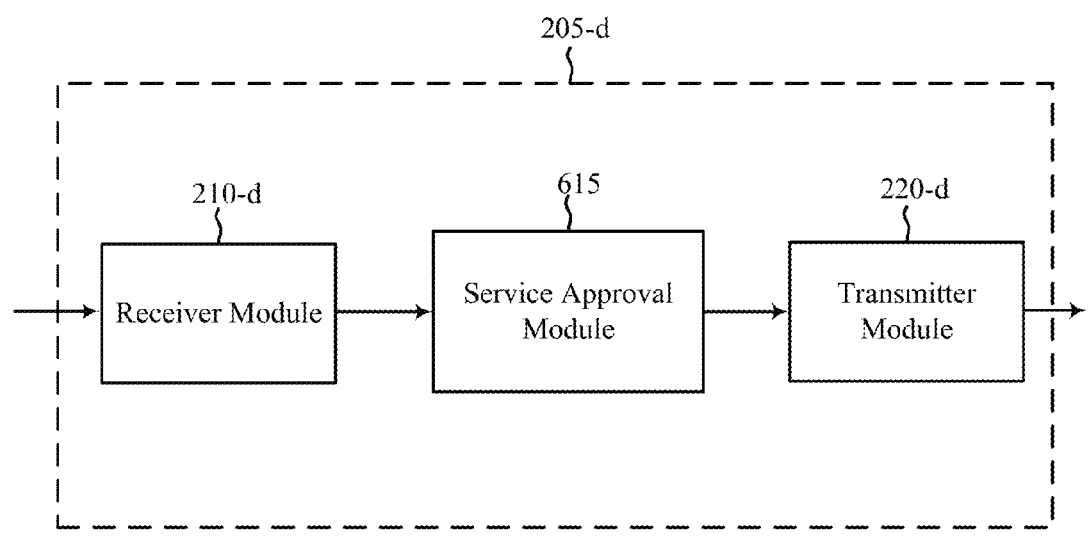
FIG. 6 shows a block diagram relating to a security and/or an automation system, in accordance with various aspects of this disclosure.

FIG. 6 shows a block diagram 600 of an apparatus 205-*d* for use in electronic communication, in accordance with various aspects of this disclosure. The apparatus 205-*d* may be an example of one or more aspects of a control panel 105, a card reader 155, a door lock 160, and/or a remote server 145, described with reference to FIG. 1. It may also be an example of an apparatus 205 described with reference to FIGS. 2-5. The apparatus 205-*d* may include a receiver module 210-*d*, a service approval module 615, and/or a transmitter module 220-*d*. The receiver module 210-*d* and transmitter module 220-*d* may be examples of the corresponding modules of the apparatus 205 of FIGS. 2-5. The apparatus 205-*d* may also include a processor. Each of these components may be in communication with each other.

The components of the apparatus 205-*d* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-custom ICs), which may be programmed in any manner known in the art. The functions of each module may also be implemented—in whole or in part—with instructions embodied in memory formatted to be executed by one or more general and/or application-specific processors.

The receiver module 210-d may receive information such as packets, user data, and/or control information associated with various information channels (e.g., control channels, data channels, etc.). The receiver module 210-d may be configured to the presence of a service personnel proximate an entry to a residence. The receiver module 210-d may detect one or more identifying characteristics of the service personnel or receive information pertaining to an identity and purpose of visit of the personnel. Information may be passed on to the service approval module 615, and to other components of the apparatus 205-d.

The service approval module 615 may automate single time access to an automation system for an individual associated with a known company. The service approval module 615 may receive information that a service personnel is proximate an entry to a residence. The proximity may be detected via a card reader (e.g. card reader 155, FIG. 1). In one embodiment, proximity may include a pre-determined distance in any direction (e.g., 360 degrees). The card reader may include a camera and/or other detection capabilities. The card reader may detect the presence of personnel once a doorbell is activated. Upon activation, the service approval module 615 may request additional information pertaining to the personnel proximate the entryway. If the service approval module 615 determines the personnel is associated with a company, the service approval module 615 may determine which company is associated with the personnel and attempt to validate a reason for the service personnel being present at the automation system. In some embodiments, if the service personnel visit is validated by the company, the service approval module 615 may verify user-defined service parameters are satisfied. If both sets of parameters are satisfied, the service approval module 615 may take further action to authorize one or more actions to allow the service personnel to perform the duties associated with their visit.

The transmitter module 220-d may transmit the one or more signals received from other components of the apparatus 205-d. The transmitter module 220-d may transmit authenticating information to a company associated with the service personnel to validate their identity. The transmitter module 220-d may additionally transmit information pertaining to the service personnel to a user of the automation system to authorize one or more actions to be taken by the service personnel. In some examples, the transmitter module 220-d may be collocated with the receiver module 210-d in a transceiver module.

Figure 7:
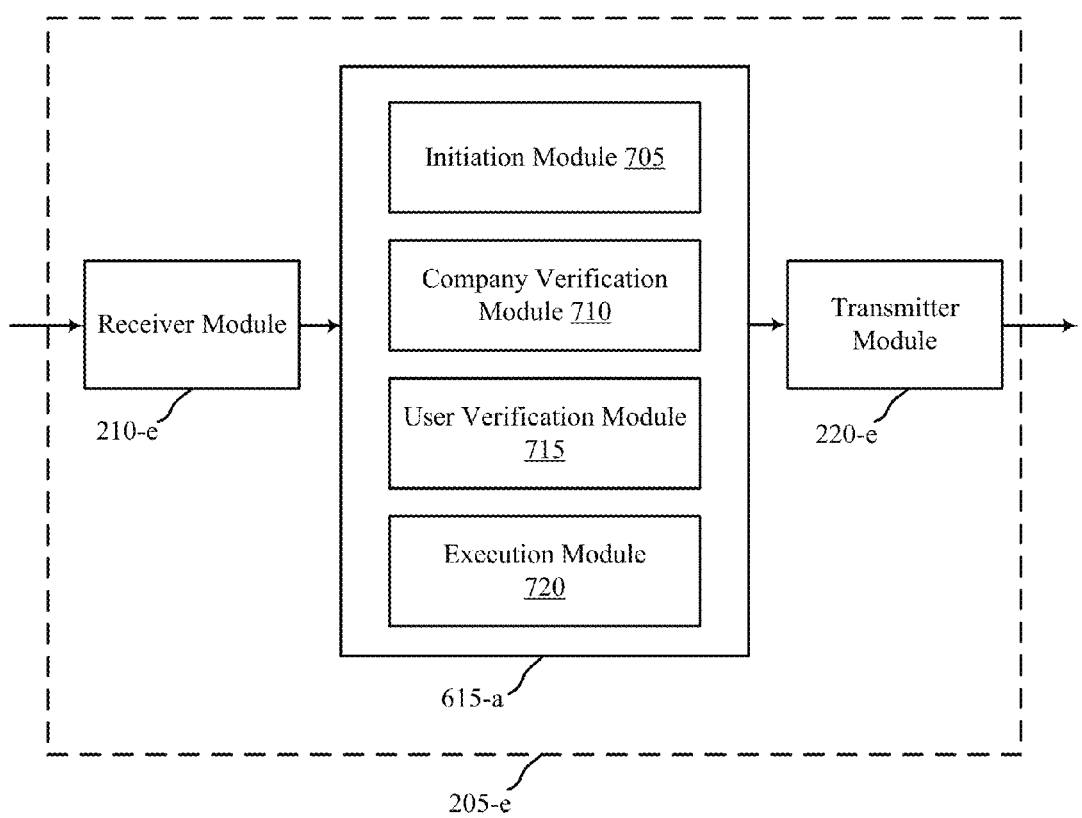
FIG. 7 shows a block diagram relating to a security and/or an automation system, in accordance with various aspects of this disclosure.

FIG. 7 shows a block diagram 700 of an apparatus 205-e for use in wireless communication, in accordance with various examples. The apparatus 205-e may be an example of one or more aspects of a control panel 105, a card reader 155, a door lock 160, and/or a remote server 145 described with reference to FIG. 1. It may also be an example of an apparatus 205 described with reference to FIGS. 2-6. The apparatus 205-e may include a receiver module 210-e, a service approval module 615-a, and/or a transmitter module 220-e, which may be examples of the corresponding modules of apparatus 205 of FIGS. 2-6. The apparatus 205-e may also include a processor. Each of these components may be in communication with each other. The service approval module 615-a may include an initiation module 705, a company verification module 710, a user verification module 715, and an execution module 720.

The components of the apparatus 205-e may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The initiation module 705 may initiate a service personnel approval process. The approval process may include approving an action to be taken by the service personnel such as a delivery, services, or the like. The initiation module 705 may receive notification of a service personnel proximate an entry to a residence. The service personnel may comprise delivery personnel, maintenance personnel, groundskeeper, cleaning personnel, contracting personnel, and the like. The notification may comprise one or more images of a personnel to from which analyze and extract information. The notification may additionally comprise a notification from a company associated with the service personnel. For example, the service personnel may initiate a remote approval process based at least in part on the indication of an automation system at the residence. The initiation module 705 may receive a request from the company associated with the personnel to begin an authorization and/or validation process. In another embodiment, the initiation module 705 may detect identifying insignia such as a logo, barcode, device detection, or the like to begin the approval process.

In some embodiments, the initiation module 705 may receive a notification from the company associated with the service personnel. For example, if the service personnel is a delivery personnel, the delivery personnel may be equipped with a personal device. The personal device may be used to scan packages for delivery confirmation. Upon scanning the package, the delivery company may recognize the delivery address as a home automation system residence. The delivery company may have protocol to follow a process associated with the home automation company. This may include sending information to an interface associated with the home automation company to request permission for a delivery. The request may detail information further confirmed below in the company verification module 710. The request may additionally request a package drop point and/or an authorization. For example, the delivery personnel may determine it is raining and wish to leave a package in a garage or in a house. Additionally, in some embodiments, the user (the recipient of the package) may wish for all packages to be left in a home.

The company verification module 710 may verify, automatically, the personnel. The company verification module 710 may ping the company associated with the personnel for one or more verification parameters. The verification parameters may comprise a name of the employee, a purpose for the visit, a time frame of the visit, and the like. The company verification module 710 may signal the company to confirm these details. The company may respond by verifying or refuting the personnel and the verification parameters. For example, the company may verify that the service personnel is indeed scheduled to visit the residence that day and perform the requested actions. The company may additionally verify the time frame the service personnel was expected to arrive. If the personnel has been verified, the company verification module 710 may communicate personnel approval to the user verification module 715.

If the company verification module 710 receives refuting information, the company verification module 710 may query the personnel for additional verifying information. The company verification module 710 may then begin the verification process again. If the personnel fails a second time, the company verification module 710 may issue a potential fraud alert. The fraud alert may result in a message to the user of a potential fraud proximate the residence and alert the user that a heightened security state is being established by the automation system. The company verification module 710 may include information in their alert to the user concerning the personnel. The information may comprise an image of the personnel, the alleged company associated with the personnel, and a reason for visiting. The user may view the information and remotely verify the personnel. For example, the user may be aware of the personnel scheduled to arrive at the house and may override refuting information. This may prevent the user from having to reschedule a visit should a deficiency arise in the verification process. Conversely, the user may confirm the rejection of the personnel. If the user rejects the personnel, one or more alerts may be issued proximate the automation system. The alert may warn the personnel to leave the premises and may establish a heightened security state at the automation system. If the personnel persists in their attempts to gain access to the residence, the automation system may automatically contact one or more authorities.

If the personnel is approved, the user verification module 715 may begin the user verification process. The user verification process may comprise a series of rules to authenticate the personnel. The series of rules may depend upon the purpose for the visit and the personnel. If the personnel does not need to access the house, the user may set predetermined rules to authorize select actions. For example, rules surrounding delivery personnel may authorize the delivery personnel to leave a package proximate the residence. A pest control service personnel may be authorized to service the outside of the house. If personnel need to access the house, the user may implement rules which require specific user approval to admit the personnel into any portion of the automation system. In some embodiments, if the entry required does not need to be specific to an area of the home, the user may determine the access points. For example, a furniture delivery personnel, grocery delivery personnel, flower delivery personnel, and the like may leave their delivery in a garage or the main part of the house. The user may have the discretion as to which part of the house to allow the personnel to access. Extended access to the residence may require specific user authentication. The specific authentication may comprise the user remotely approving the specific areas of the home to be accessed by the personnel and a predetermined duration of access.

If the personnel is verified by the company and/or the user approves the personnel, the execution module 720 may execute commands for one or more permissions to the automation system. The execution may comprise delivering an entry code to the personnel. The entry code may be similar to the short-term use code described above. The code may comprise a numerical code to enter into a user interface or a graphical code such as a barcode or QR code. The personnel may scan the graphical code into a card reader interface proximate an entry to the home. The code may grant the personnel access to the automation system according to parameters determined by the user. If the personnel does not require permission to enter the residence, the execution module 720 may execute one or more authorizations for other actions. For example, the execution module 720 may deliver authorization for a delivery personnel to leave a package at the front door. In another embodiment, the execution module 720 may remotely deactivate a portion of the automation system to allow the service personnel to access the home.

Figure 8:
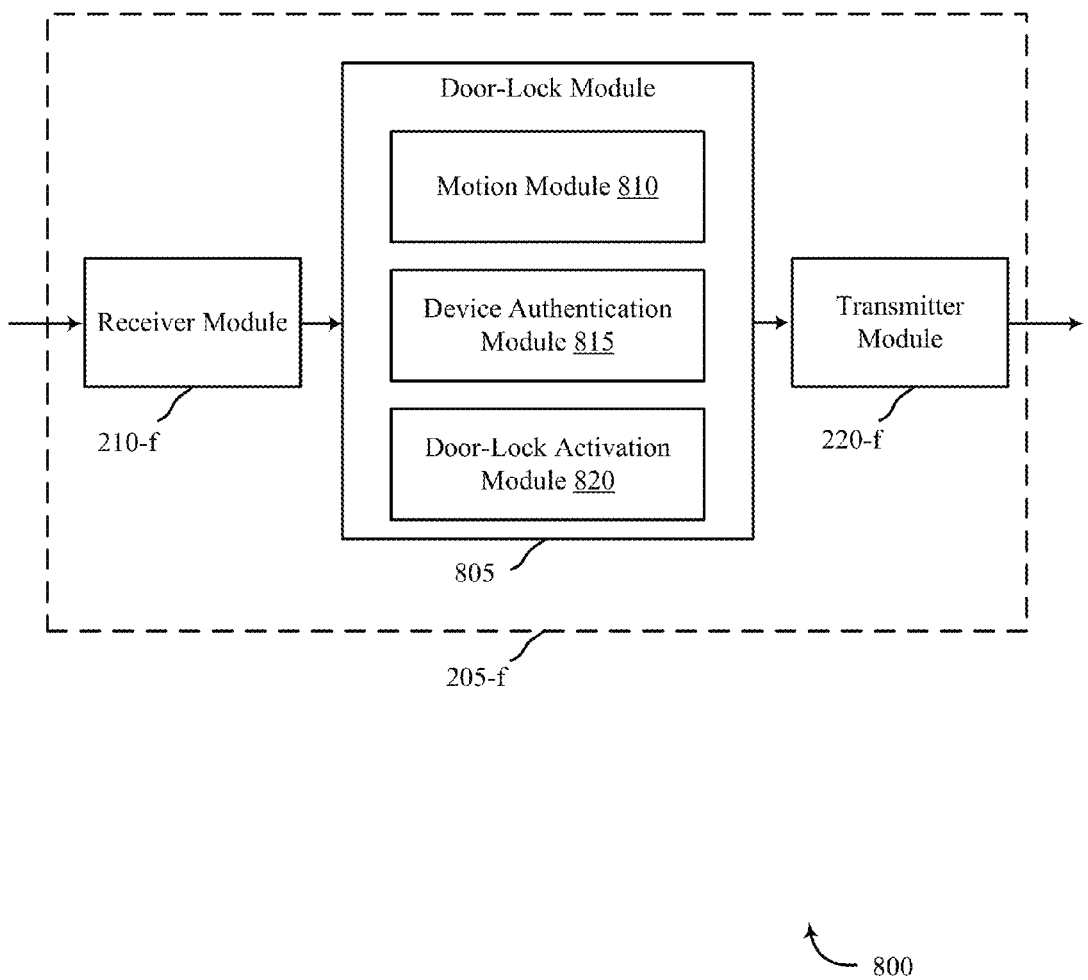
FIG. 8 shows a block diagram relating to a security and/or an automation system, in accordance with various aspects of this disclosure.

FIG. 8 shows a block diagram 800 of an apparatus 205-$f$ for use in electronic communication, in accordance with various aspects of this disclosure. The apparatus 205-$f$ may be an example of one or more aspects of a control panel 105, a card reader 155, a door lock 160, and/or a remote server 145, described with reference to FIG. 1. The apparatus 205-$f$ may include a receiver module 210-$f$, a door-lock module 805, and/or a transmitter module 220-$f$. The apparatus 205-$f$ may also be or include a processor. Each of these modules may be in communication with each other—directly and/or indirectly. In some embodiments, the door-lock module 805 may include a motion module 810, a device authentication module 815, and a door-lock activation module 820.

The components of the apparatus 205-$f$ may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210-$f$ may receive information such as packets, user data, and/or control information associated with various information channels (e.g., control channels, data channels, etc.). The receiver module 210-$f$ may be configured to receive one or more pieces of information regarding motion proximate an entry to a home, information regarding devices approaching the residence, and the like. Information may be passed on to the door-lock module 805, and to other components of the apparatus 205-$f$.

The door-lock module 805 may receive information regarding motion proximate an entry to a residence. The door-lock module 805 may determine the motion is within a motion parameter. If a motion parameter is satisfied, the door-lock module 805 may identify a device proximate the entry to the residence. If the device is associated with a user profile, the door-lock module 805 may activate a door lock (e.g. door lock 160, see FIG. 1).

The motion module 810 may receive information regarding motion proximate an entry to a residence. In some embodiments, the apparatus 205-$f$ may be a doorbell camera and the doorbell camera may sense the motion. The motion module 810 may analyze the motion to determine if a motion parameter is satisfied. The motion parameter may comprise human motion, vehicular motion, bicycle motion, animal motion, weather motion, and the like. Only specific motion parameters may enable the motion module 810 to take further actions. For example, if the motion parameter satisfied consists of animal motion or weather motion, the motion module 810 may not take any further action. However, if the motion module 810 detects human motion or vehicular motion, the motion module 810 may take further action. The motion may need to be detected within a predetermined distance from the entry to the residence. For example, if the motion is detected at the street, the motion parameter may not be satisfied. However, if the motion is detected on a front walk, in a yard, in a driveway, or the like, the motion parameter may be satisfied. The motion module 810 may detect motion related to people. For example, the motion module 810 may detect a person walking, running, a group of people, a person on a skateboard, scooter, bicycle, or the like.

The device authentication module 815 may authenticate a device proximate the entry to the residence. For example, if a motion parameter has been satisfied, the motion module 810 may prompt the device authentication module 815 to emit a discovery signal. The discovery signal may attempt to locate a device proximate the entry. The discovery signal may detect devices outside of the home. Additionally, the discovery signal may detect devices within a predetermined range. The discovery signal may consist of ANT+, Bluetooth, cellular, IEE protocols, ISA protocols, infrared communication system, near field communication (NFC), radio frequency identification (RFID), wireless personal are network (WPAN) protocols, ultra-wide band (UWB) protocols, Wi-Fi, wireless highway addressable remote transducer (HART) protocols, Wireless USB, Zigbee, Z-wave, some combination thereof, and the like.

If the device authentication module 815 detects at least one device, the device authentication module 815 may validate the authenticity of the device. Validating the authenticity may comprise associating the device with at least one user, wherein the user has a user profile associated with the automation system. For example, the device may be a mobile device and may have a mobile identification number, a mobile subscription identification number, an open device identification number, device serial number, or the like. The automation system may link the identification number to a user profile.

The device authentication module 815 may additionally be able to determine if a device has newly connected to the automation system. For example, a device may have recently connected to a wireless network associated with the automation system. Recently may be within the previous ten minutes prior to motion detection. If the device authentication module 815 detects a recently connected device, the device authentication module 815 may determine a device identification number and determine if the device is associated with a user profile.

In some embodiments, multiple devices may be detected by the device authentication module 815. The device authentication module 815 may determine if each device is connected to a user profile. As long as one device is connected to the automation system, the device authentication module 815 may authorize the door-lock activation module 820. In some embodiments, the device may be associated with a guest profile and may have select permissions.

The door-lock activation module 820 may activate a door-lock mechanism (e.g. door lock 160). The door-lock activation module 820 may receive confirmation that at least one device associated with the automation system has been identified proximate an entry to the residence. The door-lock activation module 820 may enable one or more processors and/or other functions of a door lock to activate. By enabling the door lock to activate prior to tactile input, the door-lock activation module 820 may prevent a person from waiting for a door lock to start and prepare for user input. Instead, the door-lock activation module 820 may preempt a user's attempt to access a home and may enable a user to immediately gain access to a home. In some embodiments, the door-lock activation module 820 may not only activate the door lock but may additionally unlock the door lock. This may enable the user to have a completely key and user input free method of entering a residence.

In some embodiments, a guest to the automation system may have similar abilities. A user of the automation system may set guest parameters and if the guest adheres to guest parameters, the door-lock activation module 820 may activate and unlock a door lock for the guest. The parameters may comprise visitation parameters such as day of the week, time of day, specific date, and the like. This may enable a user to allow a guest entry to a home without providing a key or a key code or the like to a guest.

The transmitter module 220-f may transmit the one or more signals received from other components of the apparatus 205-f. The transmitter module 220-f may transmit one or more activation signals to a door lock proximate an entry to a residence. The transmitter module 220-f may additionally transmit one or more signals to detect a device proximate the entry to the home. In some examples, the transmitter module 220-f may be collocated with the receiver module 210-f in a transceiver module.

Figure 9:
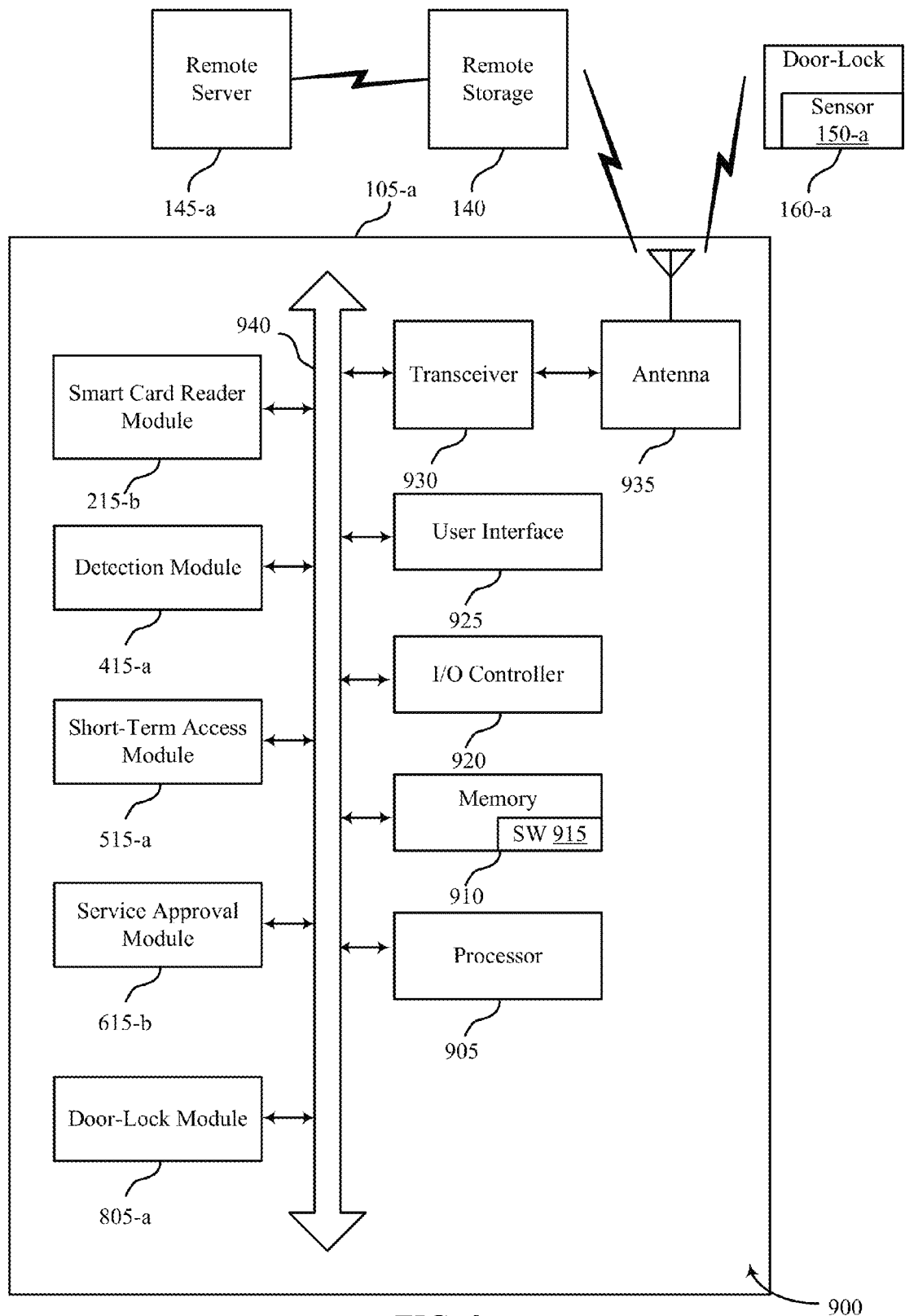
FIG. 9 shows a block diagram relating to a security and/or an automation system, in accordance with various aspects of this disclosure.

FIG. 9 shows a system 900 for use in smart card reader systems, in accordance with various examples. System 900 may include a control panel 105-a which may be an example of one or more aspects of a control panel 105 described with reference to FIG. 1. Control panel 105-a may also be an includes aspects one or more embodiments of the apparatus 205 described with reference to FIGS. 2-8. A door lock 160-a may be an example of the door lock 160 described with reference to FIG. 1 and may include aspects of one or more embodiments of the apparatus described with reference to FIGS. 2-8. A remote server 145-a may be an example of the remote server 145 described with reference to FIG. 1 and may include aspects of one or more embodiments of the apparatus described with reference to FIGS. 2-8. While this exemplary embodiment shows the control panel 105-a connecting to the door lock 160-a and the remote server 145-a, components described herein may additionally be included in the door lock 160-a and/or the remote server 145-a.

The control panel 105-a may also include components for bi-directional voice and data communications including components for transmitting communications and components for receiving communications. For example, the control panel 105-a may communicate bi-directionally with one or more of door lock 160-a, one or more sensors 150-a, remote storage 140, and/or remote server 145-a, which may be an example of the remote server of FIG. 1. This bi-directional communication may be direct (e.g., control panel 105-a communicating directly with remote storage 140) or indirect (e.g., control panel 105-a communicating indirectly with remote server 145-a through remote storage 140).

The smart card reader module 215-b may identity and take action on an identification card based at least in part on one or more self-identifying aspects of the card as described above with reference to FIGS. 2 and/or 3. For example, the smart card reader module 215-b may receive information regarding the detection of one or more cards proximate a card reader and identify one or more features of the card. The smart card reader module 215-b may use the self-identifying information to determine a next action. For example, if the card is linked to a profile, the smart card reader module 215-a may take actions listed in the profile such as disabling a security system, unlocking an entry, and the like. If the features identify the card as not having a profile, the smart card reader module 215-*b* may send one of more features of the card to a user of the automation system requesting input on further actions.

The short-term access module 515 may detect an identification card based at least in part on one or more signaling parameters discussed above with reference to FIG. 4. The short-term access module 515 may comprise ANT+, Bluetooth, cellular, IEE protocols, ISA protocols, infrared communication system, near field communication (NFC), radio frequency identification (RFID), wireless personal are network (WPAN) protocols, ultra-wide band (UWB) protocols, Wi-Fi, wireless highway addressable remote transducer (HART) protocols, Wireless USB, Zigbee, Z-wave, some combination thereof, and the like. The various signaling parameters may enable an automation system to detect a variety of identification features associated with multiple companies and/or personnel.

The detection module 415-*a* may allow an individual to access an automation system based on one or more short-term access parameters as described above with reference to FIG. 5. The detection module 415-*a* may generate a short-term entry code which may be used with the card reader 155-*a* to gain access to one or more portions of the automation system. The code may adhere to short-term access parameters which may include time of day, date, areas of the automation system, and the like.

The service approval module 615-*b* may automate authorizations for one or more service personnel proximate a residence based at least in part on company verifications and/or user verifications as described above with reference to FIGS. 6 and/or 7. The personnel may automatically gain authorization to perform a service proximate the automation system without need for the user's direct interaction. The authorization may comprise delivery approvals, entry to the residence, or the like. The service personnel may require validation by a company associated with personnel prior to providing any authorizations to the personnel.

The door-lock module 805-*a* may detect motion, identify a device, and activate a door lock as described above with reference to FIG. 8. For example, the door-lock module 805-*a* may receive information regarding motion proximate an entry to a residence. The motion may satisfy one or more motion parameters as described above with reference to FIG. 8. In some embodiments, if a motion parameter is satisfied, the door-lock module 805-*a* may send out a discovery signal to detect one or more devices proximate the entry. If the door-lock module 805-*a* detects a device and the device is associated with a user profile, the door-lock module 805-*a* may activate a door lock. This may prevent the user from experiencing a warm up period of the door lock if the door lock had been activated using tactile inputs.

The control panel 105-*a* may also include a processor module 905, and memory 910 (including software/firmware code (SW) 915), an input/output controller module 920, a user interface module 925, a transceiver module 930, and one or more antennas 935 each of which may communicate—directly or indirectly—with one another (e.g., via one or more buses 940). The transceiver module 930 may communicate bi-directionally—via the one or more antennas 935, wired links, and/or wireless links—with one or more networks or remote devices as described above. For example, the transceiver module 930 may communicate bi-directionally with one or more of door lock 160-*a*, remote storage 140, and/or remote server 145-*a*. The transceiver module 930 may include a modem to modulate the packets and provide the modulated packets to the one or more antennas 935 for transmission, and to demodulate packets received from the one or more antenna 935. While a control panel or a control device (e.g., 105-*a*) may include a single antenna 935, the control panel or the control device may also have multiple antennas 935 capable of concurrently transmitting or receiving multiple wired and/or wireless transmissions. In some embodiments, one element of control panel 105-*a* (e.g., one or more antennas 935, transceiver module 930, etc.) may provide a direct connection to a remote server 145-*a* via a direct network link to the Internet via a POP (point of presence). In some embodiments, one element of control panel 105-*a* (e.g., one or more antennas 935, transceiver module 930, etc.) may provide a connection using wireless techniques, including digital cellular telephone connection, Cellular Digital Packet Data (CDPD) connection, digital satellite data connection, and/or another connection.

The signals associated with system 900 may include wireless communication signals such as radio frequency, electromagnetics, local area network (LAN), wide area network (WAN), virtual private network (VPN), wireless network (using 902.11, for example), 345 MHz, Z-WAVE®, cellular network (using 3G and/or LTE, for example), and/or other signals. The one or more antennas 935 and/or transceiver module 930 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 935 may receive signals or information specific and/or exclusive to itself. In other embodiments, each antenna 935 may receive signals or information not specific or exclusive to itself.

In some embodiments, one or more sensors 150-*a* (e.g., motion, proximity, smoke, light, glass break, door, window, carbon monoxide, and/or another sensor) may connect to some element of system 900 via a network using one or more wired and/or wireless connections.

In some embodiments, the user interface module 925 may include an audio device, such as an external speaker system, an external display device such as a display screen, and/or an input device (e.g., remote control device interfaced with the user interface module 925 directly and/or through I/O controller module 920).

One or more buses 940 may allow data communication between one or more elements of control panel 105-*a* (e.g., processor module 905, memory 910, I/O controller module 920, user interface module 925, etc.).

The memory 910 may include random access memory (RAM), read only memory (ROM), flash RAM, and/or other types. The memory 910 may store computer-readable, computer-executable software/firmware code 915 including instructions that, when executed, cause the processor module 905 to perform various functions described in this disclosure (e.g., detecting self-identifying features of a card, performing one or more actions based on the self-identifying features, activating a door lock, etc.). Alternatively, the computer-executable software/firmware code 915 may not be directly executable by the processor module 905 but may cause a computer (e.g., when compiled and executed) to perform functions described herein. Alternatively, the computer-readable, computer-executable software/firmware code 915 may not be directly executable by the processor module 905 but may be configured to cause a computer (e.g., when compiled and executed) to perform functions described herein. The processor module 905 may include an intelligent hardware device, e.g., a central processing unit (CPU), a microcontroller, an application-specific integrated circuit (ASIC), etc.

In some embodiments, the memory 910 can contain, among other things, the Basic Input-Output system (BIOS) which may control basic hardware and/or software operation such as the interaction with peripheral components or devices. For example, the modules to implement the present systems and methods may be stored within the memory 910. Applications resident with system 900 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 930, one or more antennas 935, etc.).

Many other devices and/or subsystems may be connected to one or may be included as one or more elements of system 900 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 9 need not be present to practice the present systems and methods. The devices and subsystems can be interconnected in different ways from that shown in FIG. 9. In some embodiments, an aspect of some operation of a system, such as that shown in FIG. 9, may be readily known in the art and are not discussed in detail in this application. Code to implement the present disclosure can be stored in a non-transitory computer-readable medium such as one or more of memory 910 or other memory. The operating system provided on I/O controller module 920 may be iOS®, ANDROID®, MS-DOS®, MS-WINDOWS®, OS/2®, UNIX®, LINUX®, or another known operating system.

The transceiver module 930 may include a modem configured to modulate the packets and provide the modulated packets to the antennas 935 for transmission and/or to demodulate packets received from the antennas 935. While the control panel or control device (e.g., 105-*a*) may include a single antenna 935, the control panel or control device (e.g., 105-*a*) may have multiple antennas 935 capable of concurrently transmitting and/or receiving multiple wireless transmissions.

Figure 10:
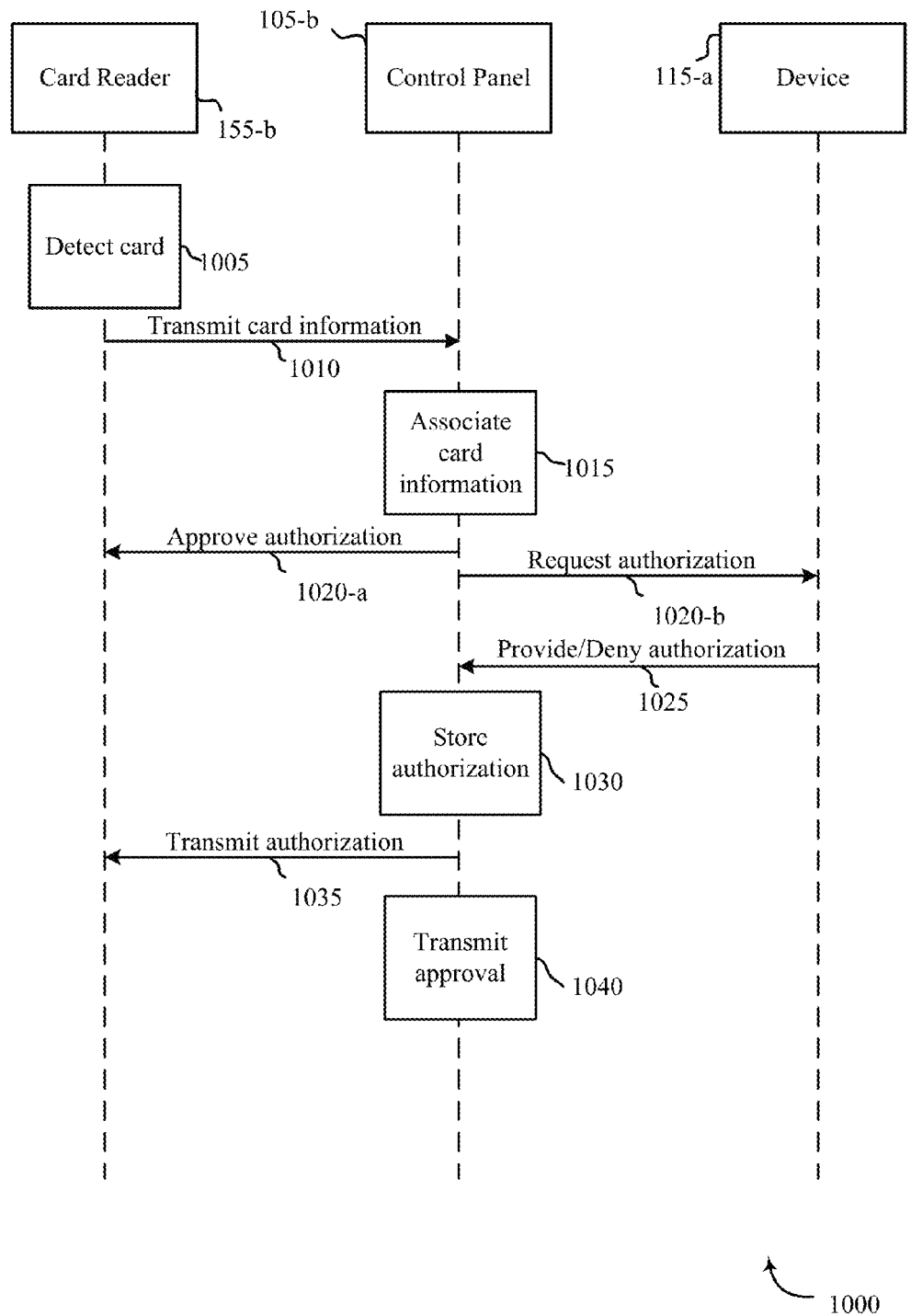
FIG. 10 shows a swim diagram relating to a security and/or an automation system, in accordance with various aspects of this disclosure.

FIG. 10 shows a system 1000 for use in smart card reader systems and/or smart authorization systems, in accordance with various examples. System 1000 may include a control panel 105-*b* which may be an example of one or more aspects of a control panel 105 described with reference to FIGS. 1 and/or 9. Control panel 105-*b* may also include aspects one or more embodiments of the apparatus 205 described with reference to FIGS. 2-8. The system 1000 may include a card reader 155-*b* and/or a device 115-*a* which may one example of a card reader 155 and a device 115 described with respect to FIG. 1. While this embodiment shows specific actions being taken by the control panel 105-*b*, the same actions may be performed by the card reader 155-*b* and/or a remote server (e.g. remote server 145).

The card reader 155-*b* may detect a card 1005 proximate the card reader 155-*b*. The card reader 155-*b* may use multiple technologies to detect the card 1005. The card reader 155-*b* may use include a proximity card reader, smart card reader, Wiegand card, Magnetic strip, barcode, photo ID reader, access control card reader, some combination thereof, or the like. The card reader 155-*a* may additionally comprise an image capture device such as a camera, video camera, and/or security camera. The image capture device may capture an image of the card and/or a uniform of personnel associated with the card.

In this example, the card reader 155-*b* may transmit the card information 1010 to the control panel 105-*b*. The control panel 105-*b* may associate the card information 1015 into one of three categories. The categories may comprise user profile, personnel profile, and unknown. In some embodiments, associating the card information 1015 may comprise validating one or more pieces of information pertaining to the personnel. The validation may comprise validating the identity of the personnel, the authenticity of the card, the credibility of the package, and the like. If the card information pertains to a user profile and/or a personnel profile with definitive actions requested, the control panel may approve authorization 1020-*a* of the personnel and implement the requested actions in either profile.

If the card information falls into the unknown category, the control panel 105-*b* may request authorization 1020-*b* from a user via the device 115-*a*. The authorization may comprise a preselected list of approval or denial requests. The authorization may additionally comprise an open-ended request for instructions. The user may use the device 115-*a* to provide and/or deny authorization 1025. The control panel 105-*b* may store the authorization, or lack thereof, 1030 for future reference. The control panel 105-*b* may then transmit the authorization, or lack thereof, 1035 to the personnel. In some embodiments, if written approval is required, the control panel 105-*b* may transmit approval 1040 to the personnel. For example, approval may be required if a signature upon delivery of a package is required, or other situations requiring home owner approval. The approval may be transmitted using electronic technologies such as an SMS, email, or the like.

Figure 11:
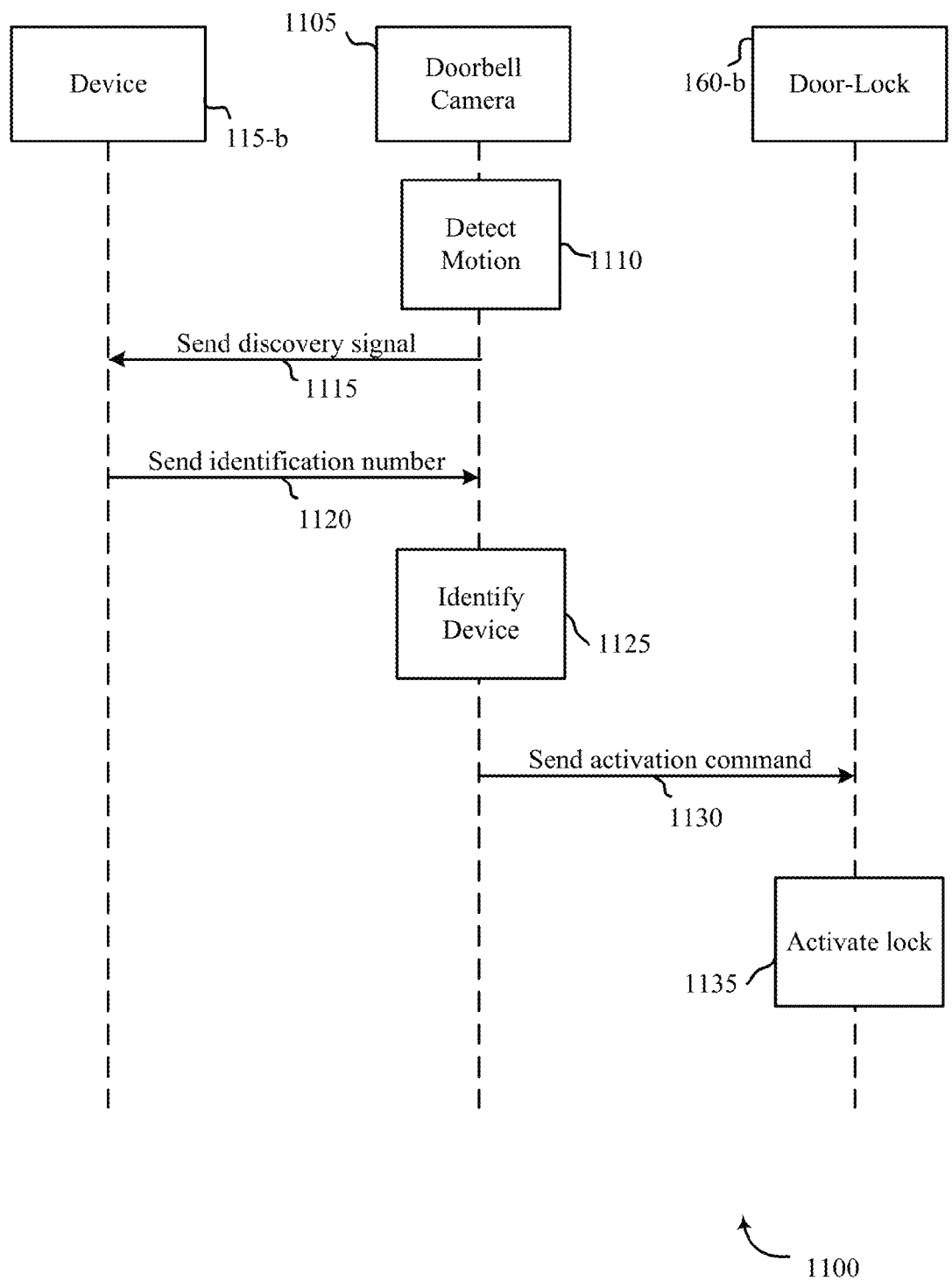
FIG. 11 shows a swim diagram relating to a security and/or an automation system, in accordance with various aspects of this disclosure.

FIG. 11 shows a system 1100 for use in smart door lock systems, in accordance with various examples. System 1100 may include a doorbell camera 1105 which may be an example of one or more aspects of a card reader 155 described with reference to FIG. 1. The doorbell camera 1105 may include aspects of the card reader but be further equipped with the ability to detect more than just a card proximate an entry to a home. The doorbell camera 1105 may additionally include one or more aspects of the apparatus 205 described with reference to FIGS. 2-8. The system 1100 may include a device 115-*b* and a door lock 160-*b* which may one example of a device 115 and a door lock 160 described with respect to FIG. 1. While this embodiment shows specific actions being taken by the doorbell camera 1105, the same and/or similar and/or select actions may be performed by a control panel and/or a remote server (e.g. control panel 105 and/or remote server 145).

The doorbell camera 1105 may detect motion 1110 proximate an entry to a residence. The motion may comprise human motion, vehicular motion, motion relating to nature, and the like. The motion may additionally be within a predetermined distance of a home. In some embodiments, the doorbell camera 1105 may additionally detect noise proximate an entry to the residence. The noise may be related to a human or may be related to nature. The doorbell camera 1105 may analyze the video and audio information to determine if there is a person proximate the entry to the residence. If the doorbell camera 1105 determines the information satisfies one or more door lock activation parameters, the doorbell camera 1105 may send a discovery signal 1115. The discovery signal may be directed to a device 115-*b* which a person may be carrying. If the discovery signal locates a device 115-*b* proximate the entry to the residence, the discovery signal may request identification information from the device 115-*b*.

The device 115-*b* may respond in kind by sending its identification number 1120 to the doorbell camera 1105. The identification number may comprise a mobile identification number, a mobile subscription identification number, an open device identification number, device serial number, or the like. The doorbell camera 1105 may use the identification number to identify the device 1125. Identifying the device may comprise linking the device to a user profile associated with an automation system. The doorbell camera 1105 may additionally be able to link the device to a guest profile and/or a determine the device is a guest of the automation system by determining previous connections to a wireless network associated with the automation system.

If the device is associated with a user profile, the doorbell camera 1105 may send an activation command 1130 to the door lock 160-*b*. The door lock 160-*b* may activate the lock. Activating the lock may comprise activating at least a portion of the lock which may allow for tactile input to take a follow-on action. The tactile input may comprise a person entering a code into a touchscreen interface, entering a code into a user interface, touching the lock in a specific place, and the like. In some embodiments, the door lock 160-*b* may activate prior to a person arriving at the door lock 160-*b*.

Figure 12:
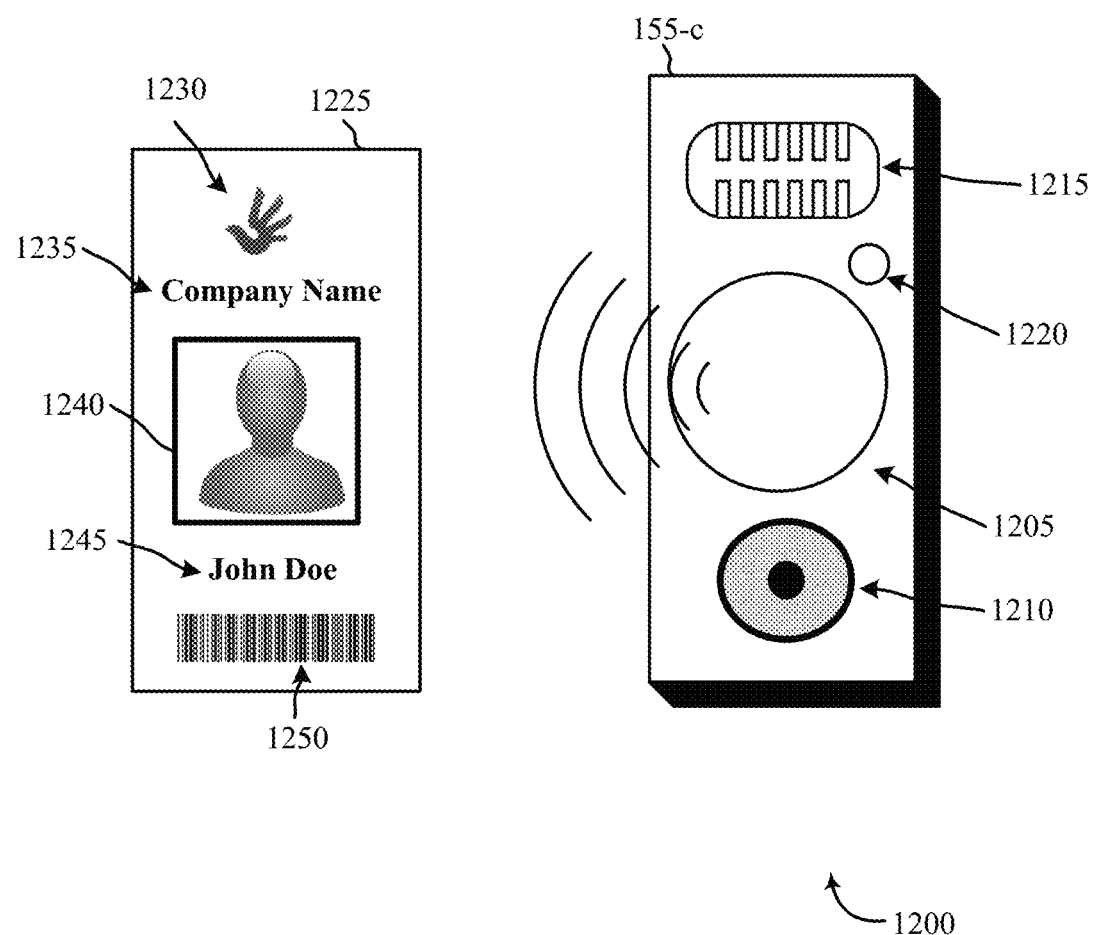
FIG. 12 shows a diagram relating to a security and/or an automation system, in accordance with various aspects of this disclosure.

FIG. 12 shows a system 1200 for use in smart card reader systems, in accordance with various examples. System 1200 may include a card reader 155-*c* which may be an example of one or more aspects of a card reader 155 described with reference to FIGS. 1, 9, and/or 10, and/or the apparatus 205 of FIGS. 2-8. The system 1200 may additionally include an exemplary identification card 1225.

The card reader 155-*c* may comprise at least one sensing unit 1205, a speaker 1210, and/or a microphone 1215. The sensing unit 1205 may be a single sensing unit or multiple sensing units. The sensing unit 1205 may comprise a proximity card reader, smart card reader, Wiegand card, Magnetic strip, barcode, photo ID reader, access control card reader, some combination thereof, or the like. The sensing unit 1205 may additionally comprise a camera unit. In some embodiments, a motion sensor 1220 may be proximate the sensing unit 1205. Activation of the motion sensor 1220 may activate the sensing unit 1205, microphone 1215, and/or speaker 1210.

The identification card 1225 may comprise one or more features. The identification card 1225 may include a company logo 1230, a company name 1235, a photograph of the employee 1240, a name of the employee 1245, and a visual self-identifying code 1250. The identification card 1225 may additionally include one or more obscure features which may wirelessly transmit one or more self-identifying features to the card reader 155-*c*. For example, the identification card 1225 may comprise a magnetic strip, an RFID unit, or the like.

In this embodiment, the visual self-identifying code 1250 is displayed as a barcode. In additional embodiments, the visual self-identifying code 1250 may additionally include a QR code, a numerical code, an alpha-numeric code, or the like. The visual self-identifying code 1250 may be clearly visible, or may be embedded into the identification card 1225. For example, the visual self-identifying code 1250 may be a watermark, or embedded into a photograph.

Personnel associated with the identification card 1225 may interact with the card reader 155-*c* using any of the mediums provided. For example, the personnel may waive their identification card 1225 a predetermined distance from the card reader 155-*c* and wait for select actions to be taken. In some embodiments, the personnel may request one or more actions, or relay information using the microphone 1215. Additionally, the automation system may interface with the personnel using the speaker 1210. The speaker 1210 may allow the automation system to audibly communicate with the personnel by dictating actions to the personnel or the like.

In select embodiments, a remote user may use features of the card reader 155-*c* as an intercom and may carry-on a conversation with the personnel even though the remote user may not be proximate a residence. This may allow the user to facilitate actions at their residence without the requirement of being physically present.

In some instances, the card reader 155-*c* may additionally ascertain information from a mobile device. For example, if an individual or personnel is granted access to the automation system, the individual and/or personnel may have received a graphical code. The individual and/or personnel may display the graphical code on their mobile device and positioned their mobile device proximate the card reader 155-*c*. The card reader 155-*c* may scan the graphical code and take one or more select actions based at least in part on an interpretation of the code.

Figure 13:
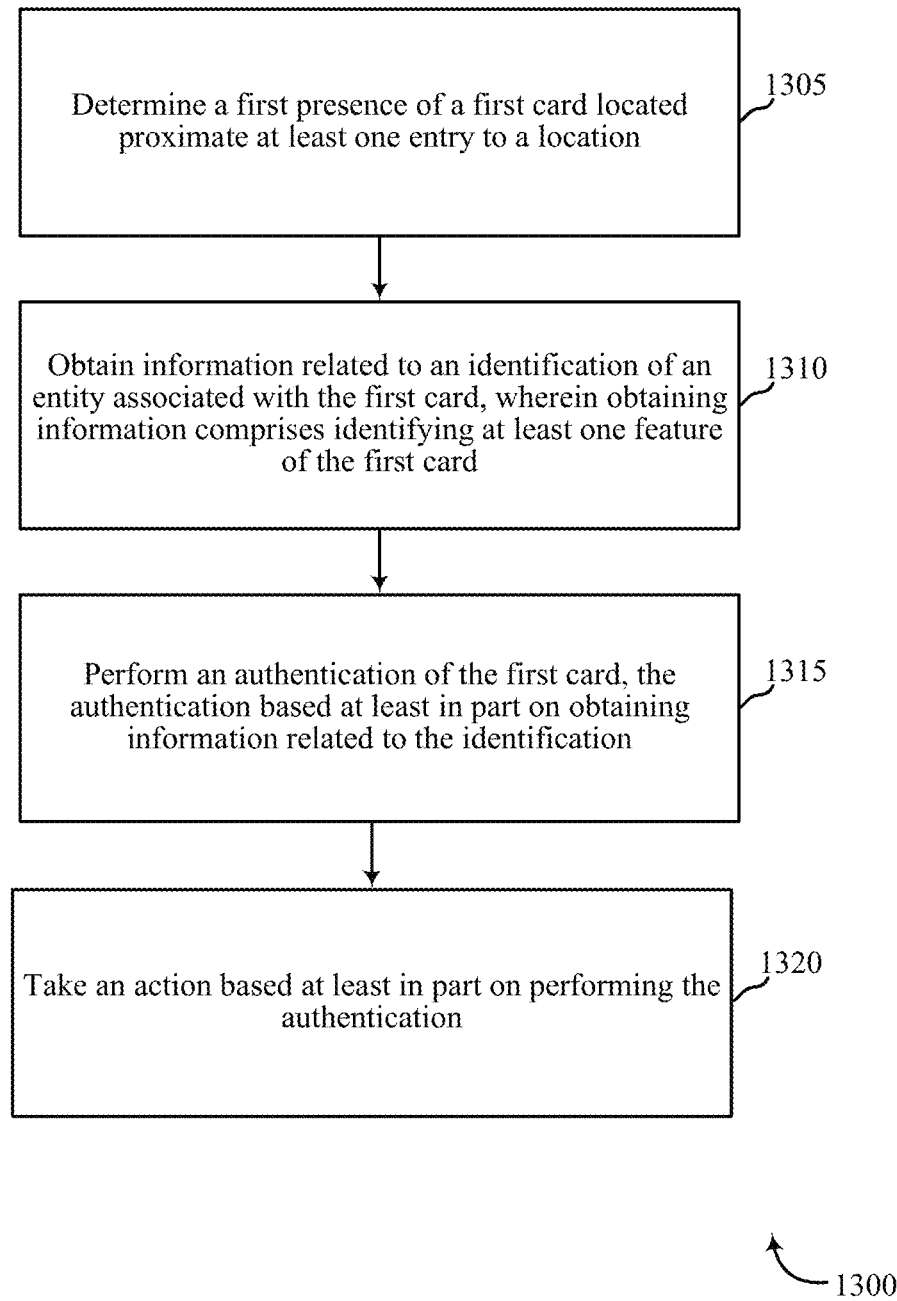
FIG. 13 is a flow chart illustrating an example of a method relating to a security and/or an automation system, in accordance with various aspects of this disclosure.

FIG. 13 is a flow chart illustrating an example of a method 1300 for smart card reader systems, in accordance with various aspects of the present disclosure. For clarity, the method 1300 is described below with reference to aspects of one or more of the systems described herein. In some examples, a control panel, card reader, server, or other device may execute one or more sets of codes to control the functional elements of the automation system to perform the functions described below. Additionally or alternatively, the control panel, card reader, server, or other device may perform one or more of the functions described below using special-purpose hardware.

At block 1305, the method 1300 may include determining a first presence of a first card located proximate at least one entry to a location. In one embodiment, a sensing unit may detect one or more cards proximate a card reader, where the card reader is located at or near the entry to a location. For example, the location may be the front door to a residence, and the card reader may be mounted near the front door, may be part of a doorbell system, and/or may be a camera mounted near the front door. The sensing unit may comprise a camera and/or one or more signaling protocols as discussed previously. The sensing unit may transmit the information regarding the detection of the card. At block 1310, the method 1300 may include obtaining information related to an identification of an entity associated with the first card, wherein obtaining information comprises identifying at least one feature of the first card. The features may comprise identifying information of the card. Examples of the features may include a self-identifying code, facial recognition of a photograph identification card, company name, personnel name, visual code, and the like. The features may be detected using a camera or may be detected using one or more wireless means, or other detection means. In some embodiments, the self-identifying code may comprise a signaling protocol which may wirelessly transfer a code and/or other information. In another embodiment, the card may comprise a pictorial representation of a self-identifying feature; for example, the card may comprise a quick response code (QR code), a barcode, an alphanumerical, numerical, or alphabetical code, a name, a photograph such as a headshot, a logo, and the like. The code may identify an issuing company of the identification card. The operation(s) at blocks 1305 and/or 1310 may be performed using the identify module 305 described with reference to FIG. 3.

At block 1315, the method 1300 may include performing an authentication of the first card, the authentication based at least in part on obtaining information related to the identification. Authentication may include associating the features with one or more profiles. For example, the features may place the personnel associated with the card into three main exemplary categories: a user of the automation system, service personnel associated with the automation system, or unknown personnel. If the features are linked to service personnel associated with the automation system, the personnel may be linked to personnel profiles. Personnel profiles may not be active user profile granting access to an automation system. Instead, personnel profiles may be limited to very specific actions with specific parameters. For example, a delivery man may access a vestibule within a five minute window of scanning a card. Cleaning personnel may access preapproved areas of a residence during their cleaning window. A dog walker may have similar approvals. If the personnel and/or company associated with the identification card is unknown, follow on actions may be required involving user input to determine appropriate actions to take. In some embodiments, the requested action may comprise validating one or more features of the identification card such as company information, authenticity of the identification card, personnel identity, package information, and the like.

The user may have a user profile which may request specific actions when their card is detected. The actions may be specific to a residence and may be programmed to rely on multiple factors such as time of year, time of day, other personnel with the user, or the like. The operation(s) at block 1315 may be performed using the permissions module 310 described with reference to FIG. 3.

At block 1320, the method 1300 may include taking an action based at least in part on performing the authentication. In one embodiment, the action may be to unlock the front door or to temporarily disable part of a security system. In another embodiment, the action may be to send a person associated with the card an entry code or other passkey to enable entry into the home. In yet another embodiment, the action may be to request more information from an entity (e.g., a company associated with the card, the person associated with the card and currently located near the card reader).

Thus, the method 1300 may provide for smart card reader systems relating to automation/security systems. It should be noted that the method 1300 is just one implementation and that the operations of the method 1300 may be rearranged or otherwise modified such that other implementations are possible.

Figure 14:
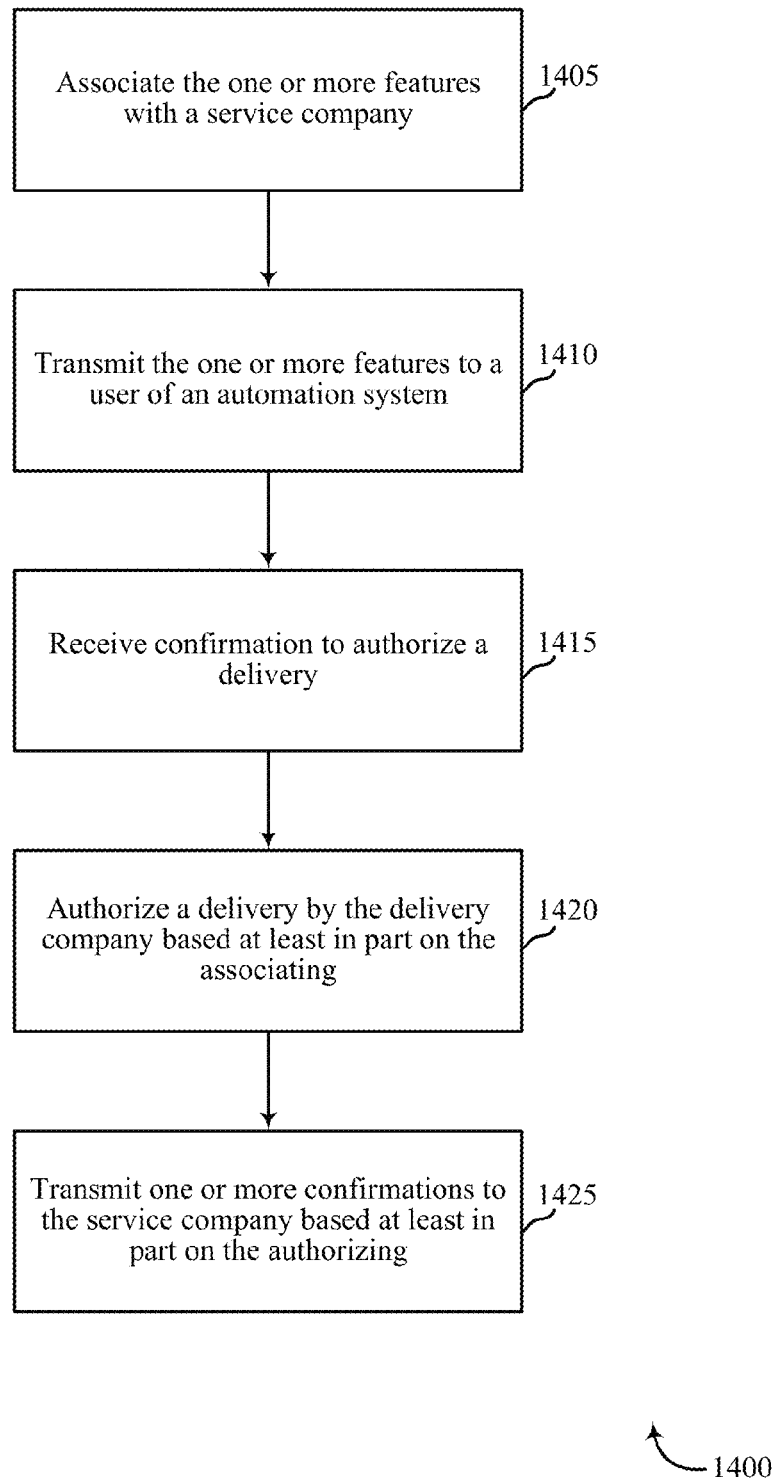
FIG. 14 is a flow chart illustrating an example of a method relating to a security and/or an automation system, in accordance with various aspects of this disclosure.

FIG. 14 is a flow chart illustrating an example of a method 1400 for smart card reader systems, in accordance with various aspects of the present disclosure. For clarity, the method 1400 is described below with reference to aspects of one or more of the systems described herein. In some examples, a control panel, card reader, server, or other device may execute one or more sets of codes to control the functional elements of the automation system to perform the functions described below. Additionally or alternatively, the control panel, card reader, server, or other device may perform one or more of the functions described below using special-purpose hardware.

At block 1405, the method 1400 may include associating the one or more features with a service company. The features may comprise any one of the self-identifying features associated with the identification card such as a company logo, employee name, unique code, facial recognition, uniform, some combination thereof, and the like. The service company may have a personnel profile which may aid in the association. In some embodiments, if a user was expecting personnel to arrive, the user may have preprogrammed visit information into the automation system which may be outside of a personnel profile. In other embodiments, the method 1400 may use other methods to associate the feature with a service company. For example, the card may include a self-identifying feature which may positively transfer the company information. In another example, a QR code may immediately transfer information pertaining to the employee and company and provide information concerning the nature of the visit. The method 1400 may additionally include searching an interne or other database to affirmatively identify the company. In some embodiments, associating the one or more features with a service company may additionally comprise validating the identity of the personnel. Once the company is identified, the method 1400 may transmit information such as a name of the employee and a photo of the employee proximate the entry way to confirm the named employee is the present personnel. This may prevent a person from using a stolen card to access the residence. The operation(s) at block 1405 may be performed using the permissions module 310 described with reference to FIG. 3.

At block 1410, the method 1400 may include transmitting the one or more features to a user of an automation system. For example, the features may not link the personnel to a personnel profile which may require further authorization from a user. The features sent to the user may include images of the card, information concerning the company, and reasons for the visit as available. In some embodiments, the personnel may verbally provide information which may be transcribed and sent to the user. Transmitting the information may also include requesting one or more actions from the user. The actions may comprise approval of the personnel's request, denying the personnel's request, requesting more information, or setting up an intercom to directly communicate with the personnel. This may allow a remote user to control aspects of their home without the need to be physically present to facilitate information.

At block 1415, the method 1400 may include receiving confirmation to authorize a delivery. If the user has the necessary information to authorize the personnel's actions, the user may provide such. The authorization may grant restricted permissions to the automation system. The restricted permissions may pertain to the reason for the visit. Such as unlocking a front door for a shortened duration, deactivating one or more security features, and the like. Again, this may enable a user to facilitate actions at a home without the need to be physically present. At block 1420, the method 1400 may also include authorizing a delivery by the delivery company based at least in part on the associating. This may include unlocking a front and deactivating one or more sensors proximate the necessary delivery parameters. In some embodiments, this may additionally include using a speaker function to verbally relay information to the personnel. If a visual device is proximate the personnel, the visual device may additionally enable written communications with the personnel.

At block 1425, the method 1400 may include transmitting one or more confirmations to the service company based at least in part on the authorizing. If the delivery requires a signature, the personnel may transmit, using the card reader, information pertaining to the delivery. The confirmation may be electronically sent to the personnel to and may act as a signature of a recipient. The confirmation may comprise an SMS message, ping message, email, or the like. In some embodiments, the user may remote e-sign a form and transmit the form to the personnel as confirmation.

The operation(s) at blocks 1410, 1415, 1420, and/or 1425 may be performed using the authorization module 315 described with reference to FIG. 3.

Thus, the method 1400 may provide for smart card reader systems relating to automation/security systems. It should be noted that the method 1400 is just one implementation and that the operations of the method 1400 may be rearranged or otherwise modified such that other implementations are possible.

Figure 15:
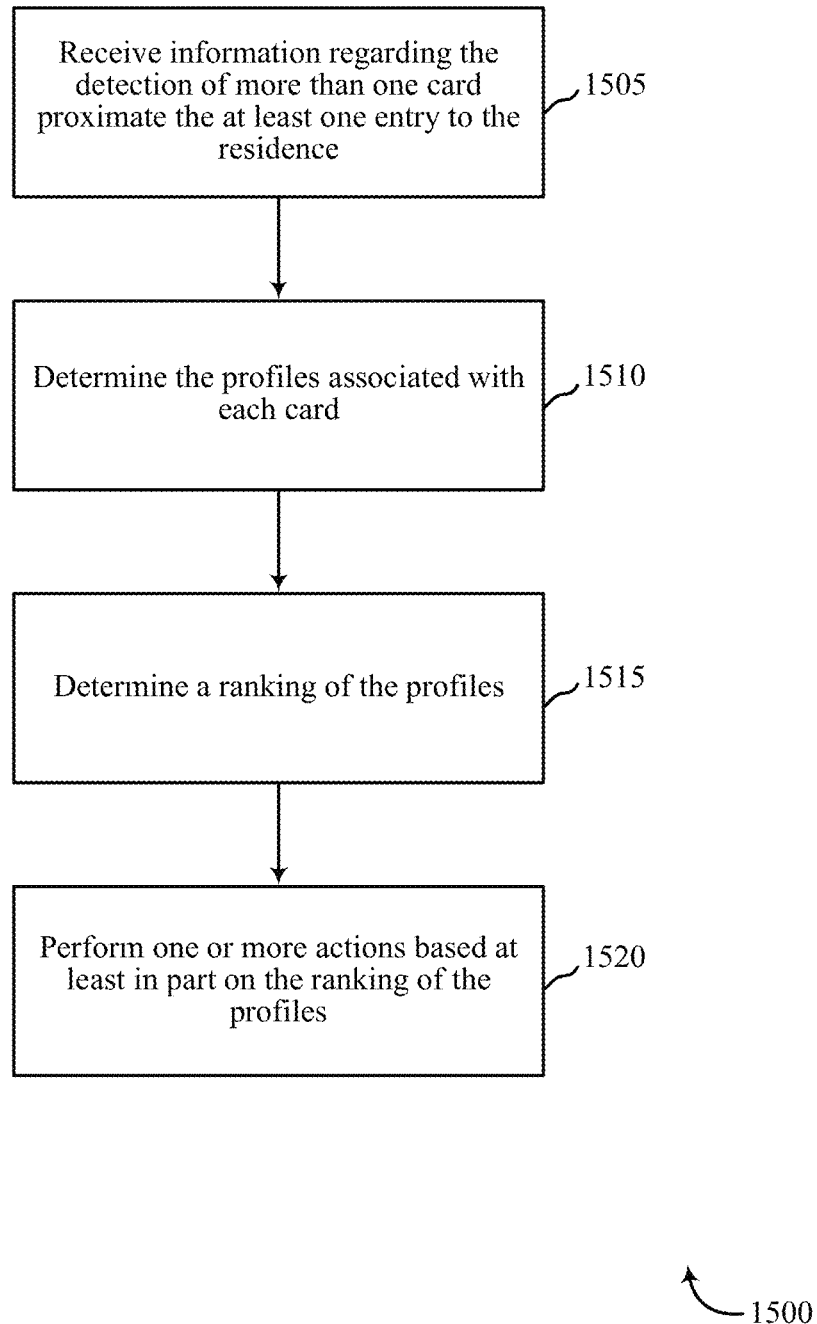
FIG. 15 is a flow chart illustrating an example of a method relating to a security and/or an automation system, in accordance with various aspects of this disclosure.

FIG. 15 is a flow chart illustrating an example of a method 1500 for smart card reader systems, in accordance with various aspects of the present disclosure. For clarity, the method 1500 is described below with reference to aspects of one or more of the systems described herein. In some examples, a control panel, card reader, server, or other device may execute one or more sets of codes to control the functional elements of the automation system to perform the functions described below. Additionally or alternatively, the control panel, card reader, server, or other device may perform one or more of the functions described below using special-purpose hardware.

At block 1505, the method 1500 may include receiving information regarding a detection of more than one card proximate the at least one entry to the residence. This may include multiple personnel scanning their card over the card reader, or the card reader may sense the cards presence wirelessly. The cards may all be similar or may be different. For example, multiple different types of personnel and/or users may be proximate the entry. The method 1500 may use means to require the identification cards of the personnel. For example, a camera proximate an entry way may sense the presence of multiple people and may require the scanning of each card prior to any action taken by an automation system.

At block 1510, the method 1500 may include determining a profile associated with each card. The profiles may comprise a user profile and/or a personnel profile. In some embodiments, at least one card may not be associated with any profile. Using the one or more self-identifying features, the method 1500 may determine which personnel are proximate the entry to the residence by linking the profile to a user.

The operation(s) at blocks 1505 and/or 1510 may be performed using the identify module 305 described with reference to FIG. 3.

At block 1515, the method 1500 may include determining a ranking of the profiles. For example, each personnel may have a user profile associated with the automation system. The profiles profile may have a seniority level and/or ranking within the automation system. An administrator and/or parent may not want actions taken that perhaps a teenager might desire. Thus, at block 1520, the method 1500 may include performing one or more actions based at least in part on the ranking of the profiles. The most sensor person in the group may take priority and their profile preferences may be respected when a group of users is proximate an entry to the residence. In some embodiments, if at least one card is not associated with a profile, actions taken may be based on one or more profiles associated with at least one other card. For example, a user of the automation system may have the ability to admit any personnel to the residence and a ranking or other action may not be required. However, if at least one user it not present upon the multiple of personnel, a user may need to authorize any actions taken by the automation system, even if at least one card is associated with a personnel profile. However, in some embodiments, the personnel profile may enable the personnel to have multiple people enter the home, such as a cleaning service and the like.

The operation(s) at block 1515 may be performed using the permissions module 310 described with reference to FIG. 3.

Thus, the method 1500 may provide for smart card reader systems relating to automation/security systems. It should be noted that the method 1500 is just one implementation and that the operations of the method 1500 may be rearranged or otherwise modified such that other implementations are possible.

Figure 16:
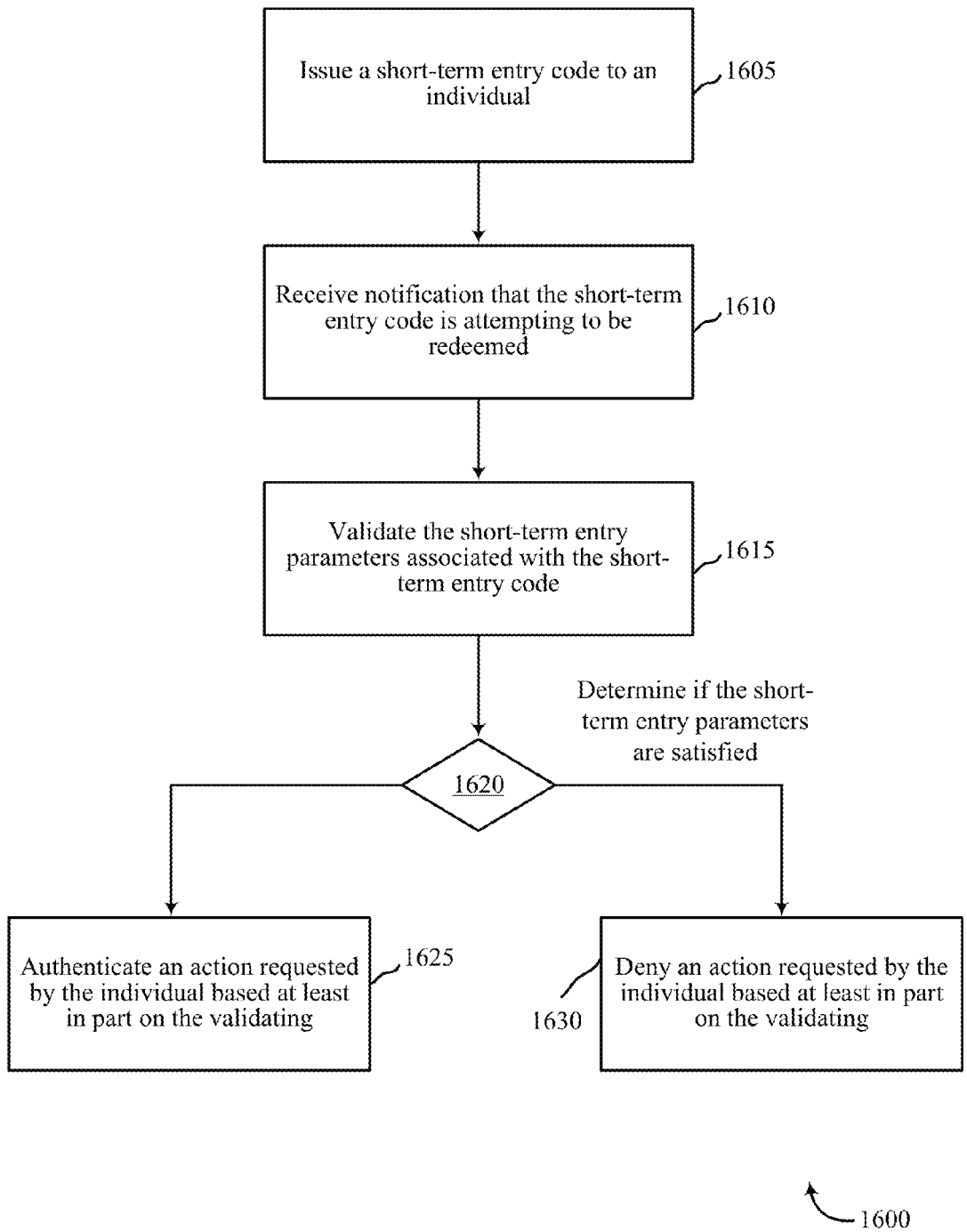
FIG. 16 is a flow chart illustrating an example of a method relating to a security and/or an automation system, in accordance with various aspects of this disclosure.

FIG. 16 is a flow chart illustrating an example of a method 1600 for short-term access codes to automation systems, in accordance with various aspects of the present disclosure. For clarity, the method 1600 is described below with reference to aspects of one or more of the systems described herein. In some examples, a control panel, card reader, server, or other device may execute one or more sets of codes to control the functional elements of the automation system to perform the functions described below. Additionally or alternatively, the control panel, card reader, server, or other device may perform one or more of the functions described below using special-purpose hardware.

At block 1605, the method 1600 may include issuing a short-term entry code to an individual. The code may be requested by a user. The user may not wish for the individual to have a user profile with associated access. Instead, the user may wish the individual to enter the premises for a single time. The individual may need to borrow an item from the user, return an item, or perform a function such as feeding a pet, watering plants, and the like. The short-term entry code may comprise entry parameters. The entry parameters may limit a day the code may be redeemed, a time of day, the areas that may be accessed, and the like. The code may be a QR code. The individual may redeem the QR code by presenting the code to a camera proximate an entry to the residence. The camera may be a part of a card reader proximate the entry.

The operation(s) at block 1605 may be performed using issue module 505 described with reference to FIG. 5.

At block 1610, the method 1600 may include receiving a notification that the short-term entry code is attempting to be redeemed. The individual may have triggered a camera proximate the entry to the residence. The individual may have presented the QR code to the camera. At block 1615, the method 1600 may include validating the short-term entry parameters associated with the short-term entry code. At block 1620, the method 1600 may validate the short-term entry parameters are satisfied. If the entry parameters are satisfied, at block 1620, the method 1600 may authenticate an action requested by the individual. The action may be equivalent to the action permitted by the user. If the entry parameters are not satisfied, at block 1630, the method 1600 may deny the action requested by the individual based at least in part on the validating. In some instances, if the parameters are not validated, the method 1600 may request information from the issuing user to determine if the action should be permitted. If the user permits the action, the action may be authorized.

The operation(s) at blocks 1605-1630 may be performed using the redemption module 510 described with reference to FIG. 5.

Thus, the method 1600 may provide for smart card reader systems relating to automation/security systems. It should be noted that the method 1600 is just one implementation and that the operations of the method 1600 may be rearranged or otherwise modified such that other implementations are possible.

Figure 17:
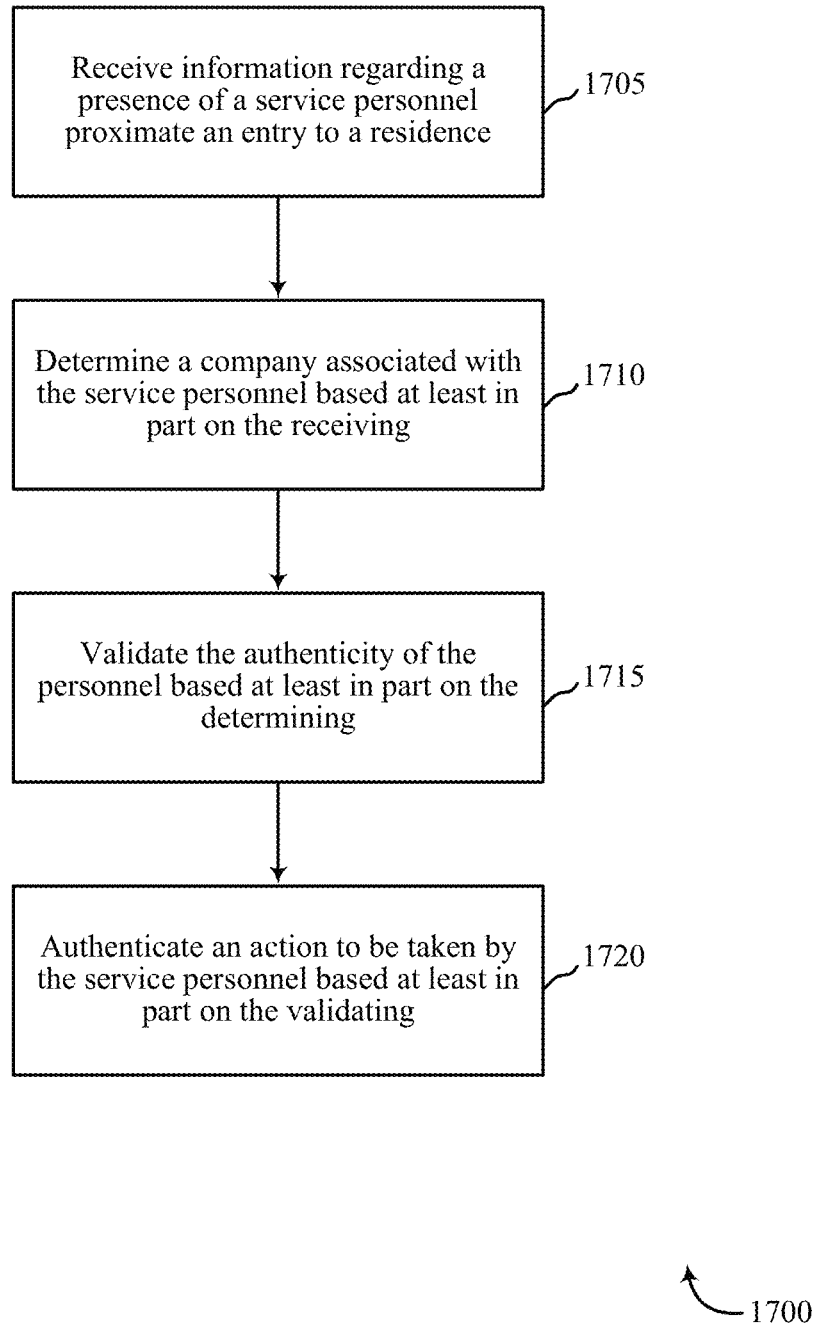
FIG. 17 is a flow chart illustrating an example of a method relating to a security and/or an automation system, in accordance with various aspects of this disclosure.

FIG. 17 is a flow chart illustrating an example of a method 1700 for smart personnel systems, in accordance with various aspects of the present disclosure. For clarity, the method 1700 is described below with reference to aspects of one or more of the systems described herein. In some examples, a control panel, card reader, server, or other device may execute one or more sets of codes to control the functional elements of the automation system to perform the functions described below. Additionally or alternatively, the control panel, card reader, server, or other device may perform one or more of the functions described below using special-purpose hardware.

At block 1705, the method 1700 may include receiving information regarding a presence of a service personnel proximate an entry to a residence. The service personnel may initiate the process. The service personnel may recognize the residence as a being associated with an automation system and may trigger the system to begin an approval process. In another instance, a camera proximate the entry to the residence may detect the presence of a service personnel. The camera may detect a uniform, a package, a service truck, or the like.

At block 1710, the method 1700 may include determining a company associated with the service personnel based at least in part on the receiving. The method 1700 may detect a logo associated with the personnel and determine a company from the logo. Additionally, a barcode may be scanned and may identify the company associated with the personnel. If the personnel initiated the process, the personnel may self-identify a company. In some embodiments, the personnel may additionally provide a validation code to use in authenticating the personnel. In some instances, a device belonging to the personnel may be identified. The device may provide identifying information such as company information, personnel information, or the like.

The operation(s) at blocks 1705-1710 may be performed using the initiation module 705 described with reference to FIG. 7.

At block 1715, the method 1700 may include validating the authenticity of the personnel based at least in part on the determining. Once a company is determined, the method 1700 may contact the company to validate the identity of the personnel. This may all be done automatically. A message may be sent to the company to validate the personnel. The message may request the company to validate the presence of the personnel at the residence. For example, a delivery company may validate that personnel are currently en route to deliver a package to the residence and that the personnel should be at the residence within a predetermined time frame. The company may provide information to the automation system detailing the necessary steps to be taken by the service personnel and requesting authorization for the actions.

The operation(s) at block 1715 may be performed using the company verification module 710 described with reference to FIG. 7.

At block 1720, the method 1700 may include authenticating an action to be taken by the service personnel based at least in part on the validating. The authentication may comprise several actions. For example, the method 1700 may provide authentication to the service personnel to leave a package at an entry to the residence. The authentication may comprise enabling the personnel access to a portion of the residence or to approve an action to be taken on the grounds. The actions taken on the grounds may comprise a grounds crew, a dog walker, or the like.

The operation(s) at block 1720 may be performed using the execution module 720 described with reference to FIG. 7.

Thus, the method 1700 may provide for smart card reader systems relating to automation/security systems. It should be noted that the method 1700 is just one implementation and that the operations of the method 1700 may be rearranged or otherwise modified such that other implementations are possible.

Figure 18:
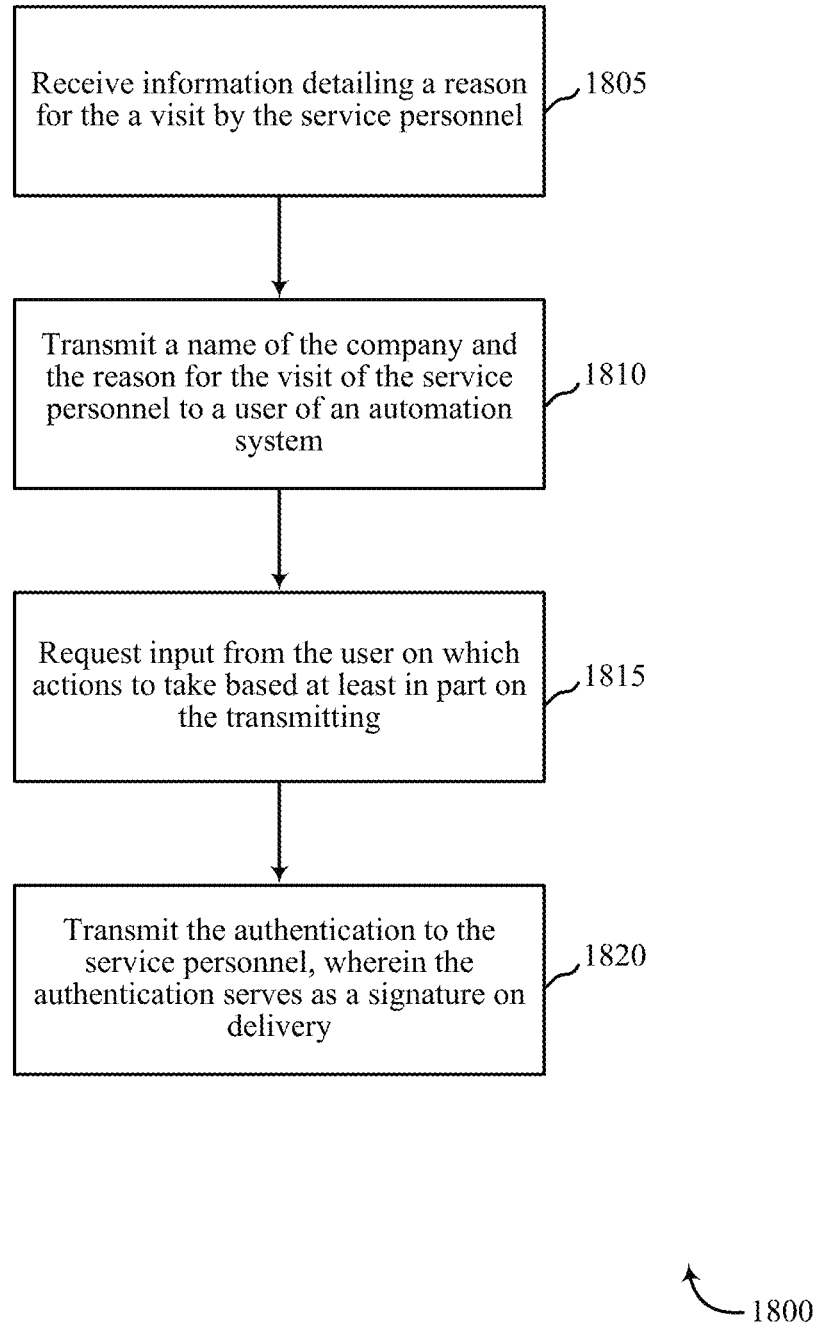
FIG. 18 is a flow chart illustrating an example of a method relating to a security and/or an automation system, in accordance with various aspects of this disclosure.

FIG. 18 is a flow chart illustrating an example of a method 1800 for smart personnel systems, in accordance with various aspects of the present disclosure. For clarity, the method 1800 is described below with reference to aspects of one or more of the systems described herein. In some examples, a control panel, card reader, server, or other device may execute one or more sets of codes to control the functional elements of the automation system to perform the functions described below. Additionally or alternatively, the control panel, card reader, server, or other device may perform one or more of the functions described below using special-purpose hardware.

At block 1805, the method 1800 may include receiving information detailing a reason for the visit by the service personnel. If the service personnel initiates the approval, the service personnel may communicate the reason for the visit in the initiation. In some embodiments, the reason for the visit may be deduced from various indicators. For example, the company may indicate the reason for the visit. A delivery company is not likely going to be doing work on the grounds. If the reason for the visit is not clear, the personnel may be requested to provide more information and details pertaining to their visit. This may include a company the service personnel works for, the reason for their visit, the duration of their visit, approvals required to fulfill the purpose of the visit, and the like.

The operation(s) at block 1805 may be performed using the initiation module 705 described with reference to FIG. 7.

At block 1810, the method 1800 may include transmitting a name of the company and the reason for the visit to a user of the automation system. At block 1815, the method 1800 may include requesting input from the user on which actions to take based at least in part on the transmitting. The user may want delivery personnel to leave a package proximate the front door or proximate a garage or shed if there is inclement weather. Likewise, the user may wish to allow the delivery personnel to leave the package inside the home if the user will not be home for an extended period of time. The user may allow a cleaning company to enter the residence and begin cleaning the home. If the residence has secure rooms with confidential data, the user may have the additional option of securing those rooms. For example, the user may remotely enable the automation system to lock specific rooms and deny personnel entry into those areas. The user may also activate a monitoring system and record footage of the personnel while they are in the home. In other instances, the user may reject any actions to be taken by personnel. The user may not wish for any service personnel to enter the home or may not wish to sign for a package or the like.

The operation(s) at blocks 1810-1815 may be performed using the user verification module 715 described with reference to FIG. 7.

At block 1820, the method 1800 may include transmitting the authentication to the service personnel, wherein the authentication serves as a signature on a delivery. Some packages require a signature upon delivery. However, it can be inconvenient for a user to be home. Instead, an authorization to leave the package at the residence may serve as a signature on the delivery and may negate the need for the user to be home during the time of delivery. Authentication to the service personnel may additionally comprise transmitting a short-term access code to the personnel to allow the personnel to access at least a portion of the automation system.

The operation(s) at block 1820 may be performed using the execution module 720 described with reference to FIG. 7.

Thus, the method 1800 may provide for smart card reader systems relating to automation/security systems. It should be noted that the method 1800 is just one implementation and that the operations of the method 1800 may be rearranged or otherwise modified such that other implementations are possible.

Figure 19:
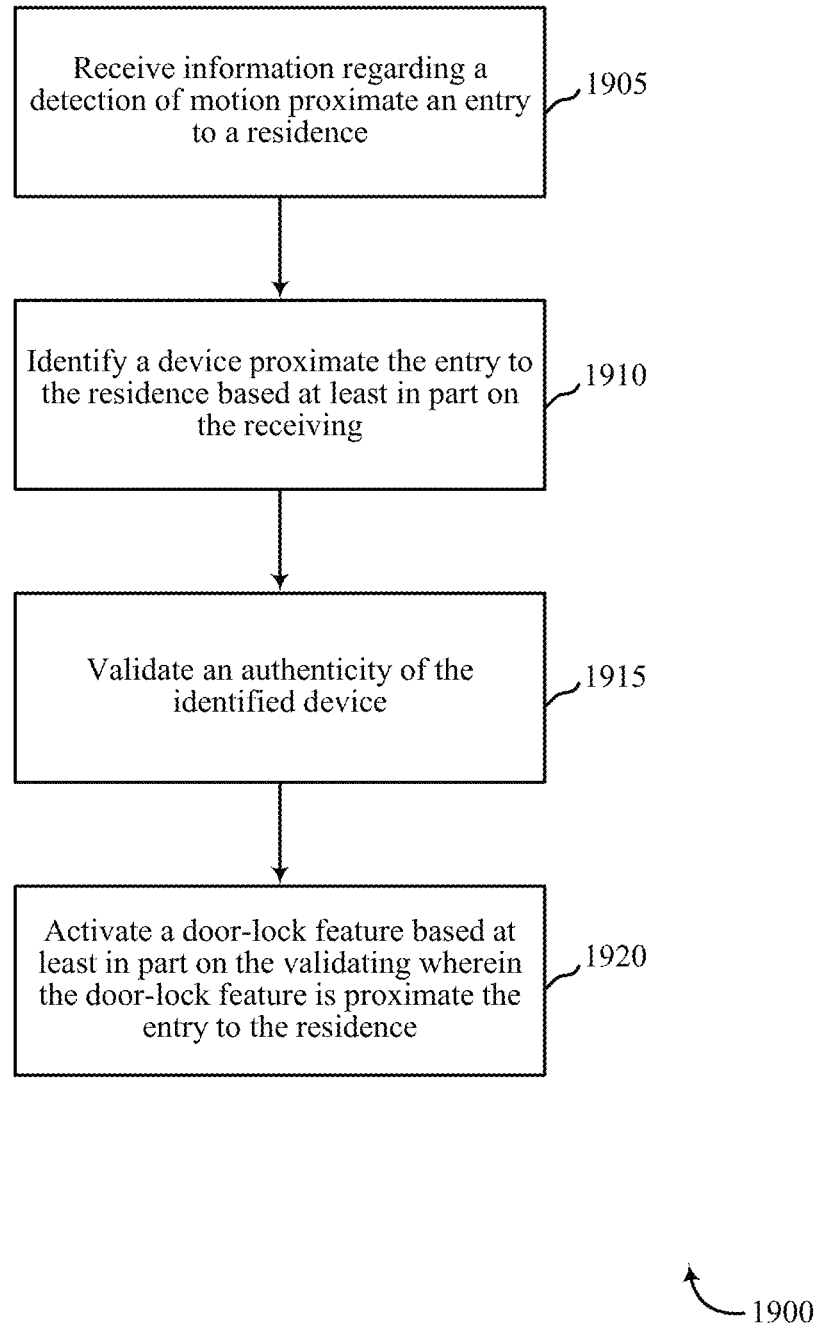
FIG. 19 is a flow chart illustrating an example of a method relating to a security and/or an automation system, in accordance with various aspects of this disclosure.

FIG. 19 is a flow chart illustrating an example of a method 1900 for smart door lock systems, in accordance with various aspects of the present disclosure. For clarity, the method 1900 is described below with reference to aspects of one or more of the systems described herein. In some examples, a control panel, card reader, server, a door lock, or other device may execute one or more sets of codes to control the functional elements of the automation system to perform the functions described below. Additionally or alternatively, the control panel, card reader, server, door lock, or other device may perform one or more of the functions described below using special-purpose hardware.

At block 1905, the method 1900 may include receiving information regarding a detection of motion proximate an entry to a residence. The motion may comprise any type of motion. The method 1900 may analyze the motion to determine a cause of the motion. For example, natural occurrences may cause motion such as weather. Animals may additionally activate a motion detection sensor. The method 1900 may determine when the motion is related to a human, such as a person walking, a vehicle moving, and the like. The method 1900 determine when human motion is within a predetermined distance of a home. For example, the motion may be in a yard, in a driveway, on a walkway, or the like. If the motion is related to a person and is within a predetermined distance from a home, one or more motion parameters may be satisfied.

The operation(s) at block 1905 may be performed using the motion module 810 described with reference to FIG. 8.

At block 1910, the method 1900 may identify a device proximate the entry to the residence based at least in part on the receiving. At block 1915, the method 1900 may include validating an authenticity of the identified device. The device may have an identification number which may be connected to a user profile, a guest profile, or the like. By linking the device to a profile, the device may be validated. If the device is not linked to any profile, or has previously connected to the automation system, the automation system may alert a user about an unknown person approaching a door.

The operation(s) at blocks 1910-1915 may be performed using the device authentication module 815 described with reference to FIG. 8.

At block 1920, the method 1900 may activating a door-lock feature based at least in part on the validating, wherein the door-lock feature is proximate the entry to the residence. The door-lock feature may comprise one or more tactile inputs proximate a door lock (e.g. door lock 160). Activating the door lock may cause the door lock to turn on and prepare for tactile input from a person. Activating the door lock prior to a person arriving at the entry may prevent a person from having to wait for the door lock to turn on before using the door lock to enter a residence.

The operation(s) at block 1920 may be performed using the door-lock activation module 820 described with reference to FIG. 8.

Thus, the method 1900 may provide for smart door lock systems relating to automation/security systems. It should be noted that the method 1900 is just one implementation and that the operations of the method 1900 may be rearranged or otherwise modified such that other implementations are possible.

Figure 20:
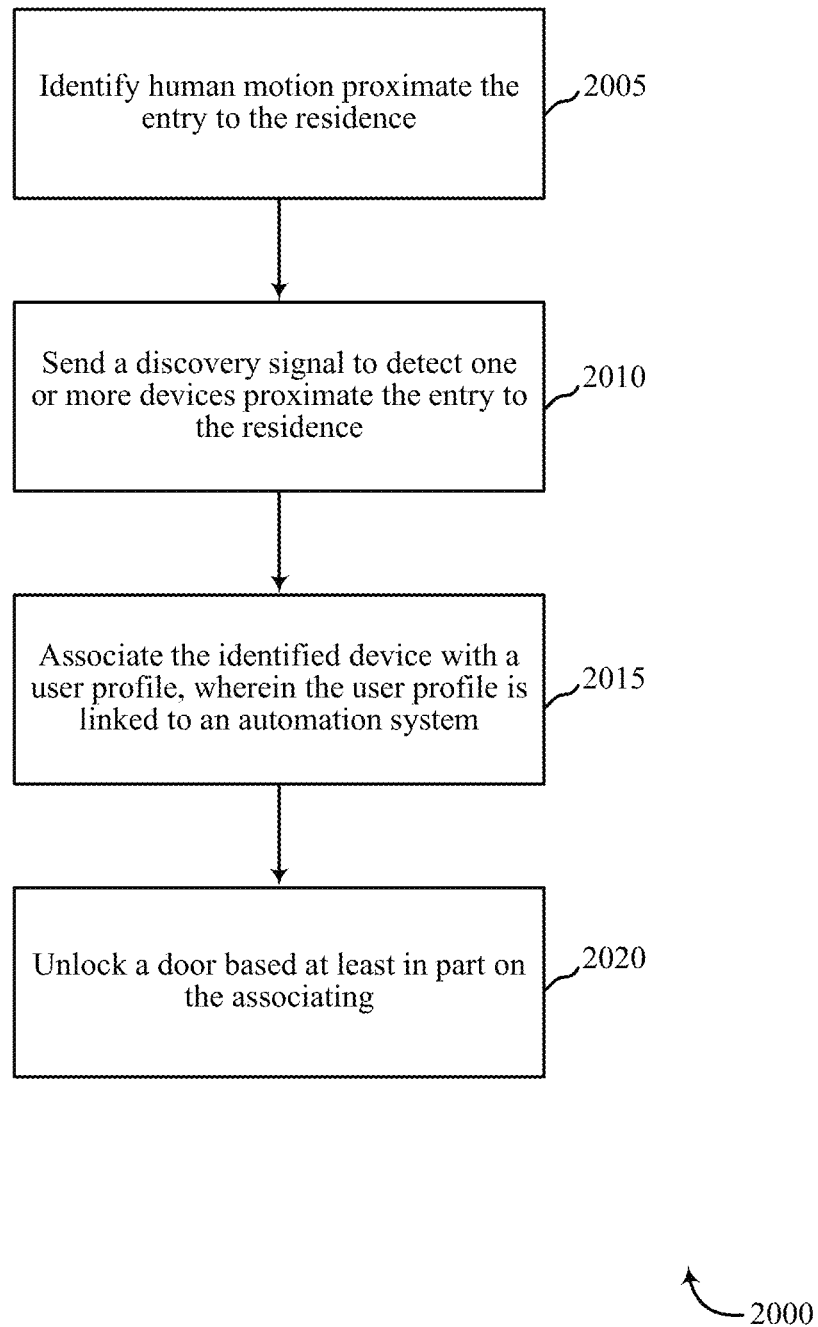
FIG. 20 is a flow chart illustrating an example of a method relating to a security and/or an automation system, in accordance with various aspects of this disclosure.

FIG. 20 is a flow chart illustrating an example of a method 2000 for smart door lock systems, in accordance with various aspects of the present disclosure. For clarity, the method 2000 is described below with reference to aspects of one or more of the systems described herein. In some examples, a control panel, card reader, server, a door lock, or other device may execute one or more sets of codes to control the functional elements of the automation system to perform the functions described below. Additionally or alternatively, the control panel, card reader, server, door lock, or other device may perform one or more of the functions described below using special-purpose hardware.

At block 2005, the method 2000 may include identifying human motion proximate the entry to the residence. The method 2000 may discern from different types of motion detected by a doorbell camera proximate the entry. The doorbell camera may be able to determine when a person is proximate the entry and when an animal such as a squirrel has passed by. In some embodiments, the method 2000 may additionally detect one or more sounds proximate an entry and may discern between human generated sounds and other sounds. The sounds may enable the method 2000 to determine a person is proximate an entry to the residence prior to the person coming into the view of the doorbell camera.

The operation(s) at block 2005 may be performed using the motion module 810 described with reference to FIG. 8.

At block 2010, the method 2000 may include sending a discovery signal to detect one or more devices proximate the entry to the residence. The discovery signal may only detect devices outside of a home. Additionally, the discovery signal may only detect devices within a predetermined range. The discovery signal may include of ANT+, Bluetooth, cellular, IEE protocols, ISA protocols, infrared communication system, near field communication (NFC), radio frequency identification (RFID), wireless personal are network (WPAN) protocols, ultra-wide band (UWB) protocols, Wi-Fi, wireless highway addressable remote transducer (HART) protocols, Wireless USB, Zigbee, Z-wave, some combination thereof, and the like. The device may respond to the discovery signal with an identification number associated with the device. If multiple devices are detected, each device may respond with its identification number. If no devices are detected, the method 2000 may repeatedly send out a discovery signal for a predetermined period of time. For example, the method 2000 may send out a continuous signal for five minutes. In other embodiments, the discovery signal may be sent periodically such as every ten seconds for three minutes. Any variation is imaginable, as long as the signal is sent for a predetermined time period on a predetermined basis.

At block 2015, the method 2000 may include associating the identified device with a user profile, wherein the user profile is linked to an automation system. The identification number may link the device to a user profile. In other embodiments, the identification number may link the device to a guest profile or a previous guest of the automation system. If the identification number is not linked to any profile, the method 2000 may alert a user of the automation system that an unknown person is approaching the door.

The operation(s) at blocks 2010-2015 may be performed using the device authentication module 815 described with reference to FIG. 8.

At block 2020, the method 2000 may include unlocking a door based at least in part on the associating. If the device is linked to a user profile, the profile may include instructions to unlock the door proximate the door lock. Unlocking the door may allow a user to walk into the residence without the need to use a key code, key, or other authentication method. Unlocking the door may include first activating door lock then sending a command to the door lock to unlock.

The operation(s) at block 2020 may be performed using the door-lock activation module 820 described with reference to FIG. 8.

Thus, the method 2000 may provide for smart door lock systems relating to automation/security systems. It should be noted that the method 2000 is just one implementation and that the operations of the method 2000 may be rearranged or otherwise modified such that other implementations are possible.

In some examples, aspects from two or more of the methods 1300-2000 may be combined and/or separated. It should be noted that the methods 1300-2000 are just example implementations, and that the operations of the methods 1300-2000 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for a security and/or automation system, comprising:
   detecting motion of an entity proximate at least one entry to a location;
   transmitting a discovery signal based at least in part on the detected motion;
   determining a first presence of a first card located proximate the at least one entry to the location based at least in part on the discovery signal;
   obtaining information related to an identification of the entity associated with the first card, wherein obtaining information comprises identifying at least one feature of the first card;
   performing an authentication of the first card, the authentication based at least in part on obtaining information related to the identification; and
   taking an action based at least in part on performing the authentication.

2. The method of claim 1, wherein taking the action further comprises:
   unlocking a door and/or disabling at least part of a security system.

3. The method of claim 1, further comprising:
   before taking the action, sending information related to performing the authentication of the first card to a user associated with the security and/or automation system; and
   receiving input from the user on which actions to take based at least in part on the information.

4. The method of claim 1, wherein performing the authentication of the first card further comprises:
   analyzing data associated with an entity profile.

5. The method of claim 4, further comprising:
   receiving additional information from the entity; and
   performing a second authentication of the first card, the authentication based at least in part on the additional information,
   wherein performing the authentication further comprises requesting additional information related to the first card.

6. The method of claim 4, wherein analyzing data associated with the entity profile further comprises:
   analyzing data associated with a service company.

7. The method of claim 6, wherein taking the action further comprises:
   authorizing a delivery to be delivered proximate to an entry to the location by the service company based at least in part on performing the authentication of the first card.

8. The method of claim 7, wherein authorizing the delivery further comprises:
   sending an entry code to a person associated with the first card.

9. The method of claim 8, wherein sending the entry code further comprises:
   sending a graphic to a portable electronic device associated with the person, wherein the graphic may be scanned by a second electronic device located proximate the entry to the location.

10. The method of claim 7, wherein authorizing the delivery further comprises sending an indication of a receipt.

11. The method of claim 7, wherein in authorizing the delivery further comprises:
    unlocking a door at the entry to the location and/or disabling at least part of a security system; and
    authoring the service company to place the delivery in an interior room associated with the location.

12. The method of claim 1, wherein determining the first presence of the first card further comprises:
    emitting a discovery signal.

13. The method of claim 12, wherein emitting the discovery signal further comprises:
    emitting a directional signal that communicates with a device external to the location.

14. The method of claim 1, wherein detecting the first presence of the first card further comprises:

obtaining identification information from the first card, wherein the first card may be at least one of: a radio frequency identification card, or a photo identification card, or an electronic chip card, or a card comprising a magnetic strip, or a smart card, or a card comprising a quick response code, or a card comprising a bar code, or a combination thereof.

15. The method of claim 1, further comprising:
determining a second presence of a second card proximate the entry to the location;
wherein obtaining information further comprises obtaining information related to a second identification of a second entity associated with the second card;
performing an authentication of the second card, the authentication based at least in part on obtaining information related to the second identification;
creating a ranking of the entity and the second entity; and
wherein taking the action further comprises taking the action based at least in part on the ranking.

16. The method of claim 15, further comprising:
determining the first card has been previously authorized; and
wherein taking the action further comprises taking a pre-determined action based at least in part on determining the first card has been previously authorized.

17. The method of claim 1, further comprising:
determining an indication of a subsequent presence of the first card, the subsequent presence occurring within a pre-determined time from the first presence.

18. An apparatus for security and/or automation systems, comprising:
a processor;
memory in electronic communication with the processor; and
instructions stored in the memory, the instructions causing the processor to:
determine a first presence of a first card proximate an entry to a location;
obtain information related to an identification of an entity associated with the first card;
perform an authentication on the first card, the authentication based at least in part on obtaining information related to the identification;
determining a second presence of a second entity proximate the entry to the location;
creating a ranking of the entity and the second entity; and
take an action based at least in part on performing the authentication and the ranking.

19. The apparatus of claim 18, wherein the instructions further cause the processor to:
determine a second presence of a second card proximate the entry to the location;
wherein when the processor obtains information, the instructions further cause the processor to obtain information related to a second identification of a second entity associated with the second card;
perform an authentication of the second card, the authentication based at least in part on obtaining information related to the second identification;
create a ranking of the entity and the second entity; and
wherein when the processor takes the action, the instructions further cause the processor to take the action based at least in part on the ranking.

20. A non-transitory computer-readable medium storing computer-executable code, the code executable by a processor to:
determine a presence of a card proximate an entry to a location;
obtain information related to an identification of an entity associated with the card;
perform an authentication on the card, the authentication based at least in part on obtaining information related to the identification;
determine a second presence of a second card proximate the entry to the location;
obtain information related to a second identification of a second entity associated with the second card;
perform an authentication on the second card, the authentication based at least in part on obtaining information related to the second identification;
create a ranking of the entity and the second entity; and
take an action based at least in part on performing the authentication and the ranking.

* * * * *